US012652173B2

(12) United States Patent
Little et al.

(10) Patent No.: US 12,652,173 B2
(45) Date of Patent: Jun. 9, 2026

(54) SYSTEM AND METHOD FOR GENERATING BLOCKCHAIN TOKEN SUPPORT FROM A SET OF DECLARATIONS

(71) Applicant: ORACLE INTERNATIONAL CORPORATION, Redwood Shores, CA (US)

(72) Inventors: Todd Little, Lafayette, CO (US); Gourav Sarkar, Bangalore (IN); Paritosh Das, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/886,680

(22) Filed: Sep. 16, 2024

(65) Prior Publication Data

US 2025/0007721 A1     Jan. 2, 2025

Related U.S. Application Data

(63) Continuation of application No. 17/514,880, filed on Oct. 29, 2021, now Pat. No. 12,095,924.
(Continued)

(51) Int. Cl.
| | |
|---|---|
| *H04L 9/32* | (2006.01) |
| *G06F 16/27* | (2019.01) |
| *H04L 9/00* | (2022.01) |

(52) U.S. Cl.
CPC ............ *H04L 9/3239* (2013.01); *G06F 16/27* (2019.01); *H04L 9/3213* (2013.01); *H04L 9/50* (2022.05)

(58) Field of Classification Search
None
See application file for complete search history.

(56) References Cited

U.S. PATENT DOCUMENTS 11,169,798 B1 *  11/2021  Palmer ................... H04L 41/16
12,095,924 B2     9/2024   Little
(Continued)

FOREIGN PATENT DOCUMENTS

CN         113050929       6/2021

OTHER PUBLICATIONS

Hyperledgendary.github, Smart Contracts and Chaincode, 2020, https://web.archive.org/web/20200907224904/https://hyperledgendary.github.io/unstable-fabric-docs/smartcontract/smartcontract.html (Year: 2020).*

(Continued)

*Primary Examiner* — Chris Parry
*Assistant Examiner* — Abderrahmen Chouat
(74) *Attorney, Agent, or Firm* — TUCKER ELLIS LLP

(57) ABSTRACT

Described herein are systems and methods for generating blockchain token support from a set of declarations. In accordance with an embodiment, an application builder (App Builder, Application Builder) component of a blockchain, blockchain cloud system, or other blockchain solution (e.g., Oracle Blockchain Platform) can provide a mechanism to define blockchain assets using a declaration or specification file, and then generate a blockchain smart contract that supports those assets. In accordance with an embodiment, the systems and methods described herein provide a mechanism for defining Tokens (e.g., Fungible or Non Fungible Tokens) adhering to a framework, such as the Token Taxonomy Framework, and generating the appropriate methods as defined by the token properties.

17 Claims, 13 Drawing Sheets

Related U.S. Application Data

(60) Provisional application No. 63/250,878, filed on Sep. 30, 2021.

(56) References Cited

U.S. PATENT DOCUMENTS

| | | | |
|---|---|---|---|
| 2016/0092590 A1* | 3/2016 | Song | G06F 16/986 |
| | | | 715/234 |
| 2019/0251018 A1 | 8/2019 | Jin | |
| 2019/0303623 A1* | 10/2019 | Reddy | G06F 8/71 |
| 2020/0067789 A1* | 2/2020 | Khuti | H04L 41/5009 |
| 2020/0351093 A1 | 11/2020 | Madhuram | |
| 2021/0067536 A1* | 3/2021 | Mylrea | H04L 9/3239 |
| 2021/0390191 A1 | 12/2021 | Doney | |
| 2021/0397656 A1* | 12/2021 | Van Dusen | G06Q 30/0279 |
| 2021/0406003 A1 | 12/2021 | Crabtree | |
| 2022/0084013 A1 | 3/2022 | Kulkarni | |
| 2022/0292268 A1 | 9/2022 | Shillingford | |
| 2023/0097203 A1 | 3/2023 | Little | |

OTHER PUBLICATIONS

Interwork Alliance, "IWA Token Taxonomy Framework", 3 pages, retrieved Jun. 4, 2021 from: retrieved: <https://interwork.org/frameworks/token-taxonomy-framework/>.

Oracle, "Using Oracle Blockchain Platform", Oracle® Cloud, © Oracle, 1 page, retrieved Jun. 4, 2021 from: retrieved: <https://docs.oracle.com/en/cloud/paas/blockchain-cloud/usingoci/index.html>.

Oracle, "Oracle Cloud Using Oracle Blockchain Platform", F26726-10, Copyright © 2020, 2021, Apr. 2021, 284 pages.

InterWork Alliance, "Token Taxonomy Framework"; retrieved from <https://github.com/InterWorkAlliance/Token TaxonomyFramework> on Apr. 19, 2024, 4 pages.

Microsoft Visual Studio, "IWA Token Designer for Visual Studio Code"; retrieved from <https://marketplace.visualstudio.com/items?itemName=InterWorkAlliance.token-designer> on Apr. 19, 2024, 6 pages.

InterWork Alliance, "Token Taxonomy Framework—Jan. 2022"; retrieved from <https://github.com/InterWorkAlliance/TokenTaxonomyFramework/blob/main/token-taxonomy.md> on Apr. 19, 2024, 41 pages.

InterWork Alliance, "Token Taxonomy Framework holdable.proto" retrieved from <https://github.com/InterWorkAlliance/TokenTaxonomyFramework/blob/main/artifacts/behaviors/holdable/latest/holdable.proto> on Apr. 19, 2024, 2 pages.

Oracle, "Using Oracle Blockchain Platform—Using Blockchain App Builder for Oracle Blockchain Platform", Oct. 2021, retrieved from <https://web.archive.org/web/20211019004009/https://docs.oracle.com/en/cloud/paas/blockchain-cloud/usingoci/using-chaincode-development-tools.html> on Apr. 19, 2024, 2 pages.

Oracle, "Using Oracle Blockchain Platform—Tokenization Support Using BlockChain App Builder", Oct. 2021, retrieved from <https://web.archive.org/web/20211017134156/docs.oracle.com/en/cloud/paas/blockchain-cloud/usingoci/> on Apr. 19, 2024, 8 pages.

United States Patent and Trademark Office, Office Communication dated Jan. 4, 2024 for U.S. Appl. No. 17/514,880 , 14 pages.

United States Patent and Trademark Office, Notice of Allowance and Fee(s) Due dated Apr. 22, 2024 for U.S. Appl. No. 17/514,880 , 14 pages.

* cited by examiner

*FIGURE 12*

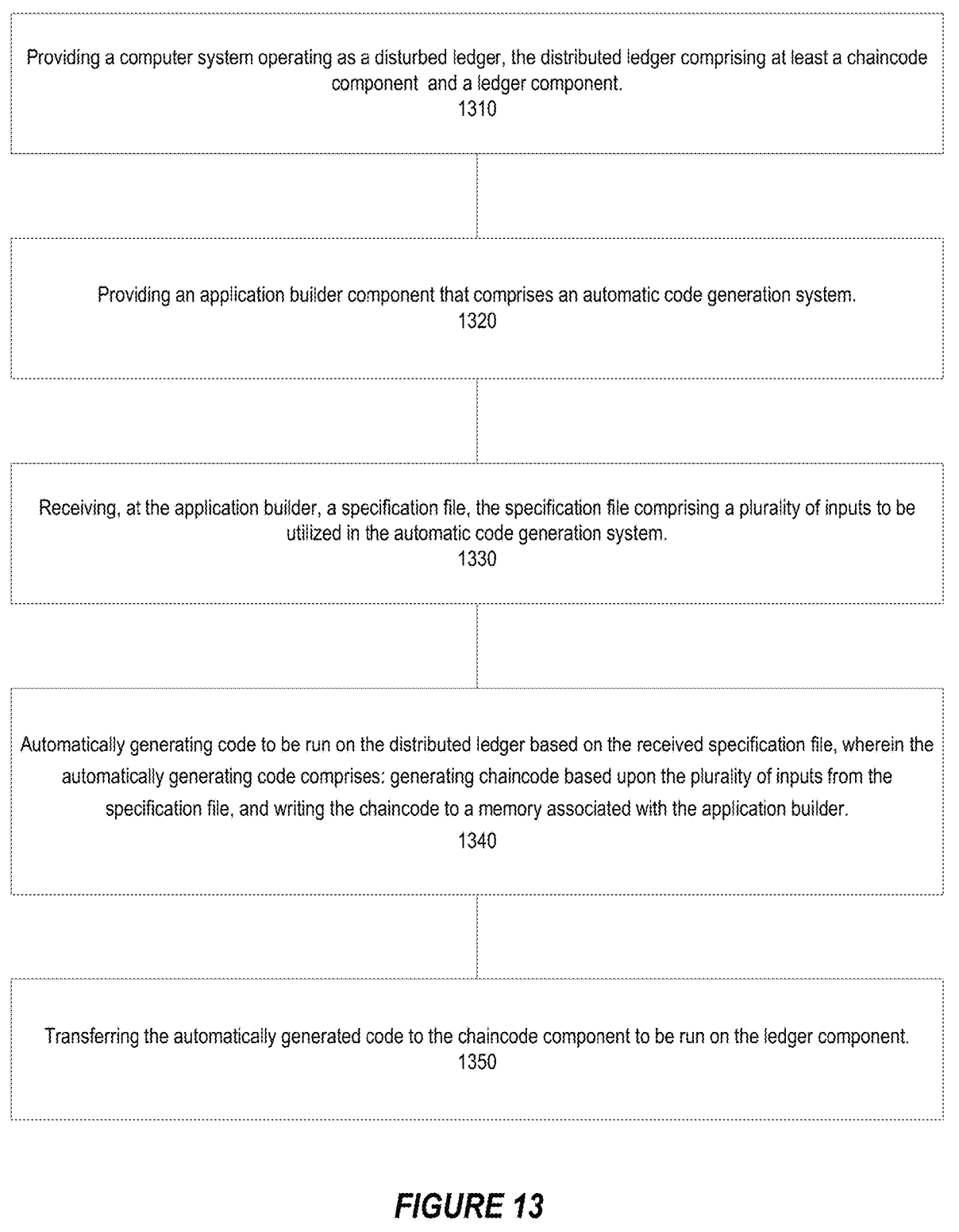

Providing a computer system operating as a disturbed ledger, the distributed ledger comprising at least a chaincode component and a ledger component.
1310

Providing an application builder component that comprises an automatic code generation system.
1320

Receiving, at the application builder, a specification file, the specification file comprising a plurality of inputs to be utilized in the automatic code generation system.
1330

Automatically generating code to be run on the distributed ledger based on the received specification file, wherein the automatically generating code comprises: generating chaincode based upon the plurality of inputs from the specification file, and writing the chaincode to a memory associated with the application builder.
1340

Transferring the automatically generated code to the chaincode component to be run on the ledger component.
1350

*FIGURE 13*

SYSTEM AND METHOD FOR GENERATING BLOCKCHAIN TOKEN SUPPORT FROM A SET OF DECLARATIONS

CLAIM OF PRIORITY

The application is a continuation of U.S. patent application entitled "SYSTEMS AND METHODS FOR GENERATING BLOCKCHAIN TOKEN SUPPORT FROM A SET OF DECLARATIONS", application Ser. No. 17/514,880, filed on Oct. 29, 2021; which claims the benefit of priority to U.S. Provisional patent application entitled "SYSTEMS AND METHODS FOR GENERATING BLOCKCHAIN TOKEN SUPPORT FROM A SET OF DECLARATIONS", Application No. 63/250,878, filed on Sep. 30, 2021; each of which above applications and the contents thereof are herein incorporated by reference.

TECHNICAL FIELD

The disclosure relates generally to distributed ledger technology, and more particularly to systems and methods for generating blockchain token support from a set of declarations.

BACKGROUND

A distributed ledger may be broadly described as a digital record of asset ownership. There is no central administrator of the ledger, nor is there a central data store. Instead, the ledger is replicated across many participating nodes in a computing environment that may be geographically spread across multiple sites, countries, or institutions. A consensus protocol ensures that each node's copy of the ledger is identical to every other node's copy. As well, the set of copies may be viewed as a single shared ledger. A distributed ledger may be used by asset owners using cryptographic signature technology, for example, to debit their account and credit another's account.

A blockchain is a data structure can be used to implement tamper-resistant distributed ledgers. Multiple nodes follow a common protocol in which transactions from clients are packaged into blocks, and nodes use a consensus protocol to agree on the next block. Blocks carry cumulative cryptographic hashes making it difficult to tamper with the ledger. Each block can have a reference [hash value] to the previous block in time. In addition, each block can comprise its own hash. The blockchain can be traversed backwards (e.g., up the chain).

Permissionless decentralized ledgers allow anonymous participants to maintain the ledger, while avoiding control by any single entity. However, identity, accountability and auditability are difficult in light of the anonymity. In contrast, permissioned decentralized ledgers allow for levels of trust and accountability by allowing explicitly authorized parties to maintain the ledger. Permissioned ledgers support more flexible governance and a wider choice of consensus mechanisms. Both kinds of decentralized ledgers may be susceptible to manipulation by participants who favor some transactions over others. However, the accountability underlying permissioned ledgers provides an opportunity for constraints that can be enforced on participants.

The emerging distributed ledger technology has the potential to allow multiple parties to collaborate in more efficient and effective way, where transactions can be sent to any peer node, and a unique and consensus view will be achieved among all members of the network. No matter for public blockchain or consortium blockchain, the security and performance under large-scale deployment are critical requirements.

SUMMARY

Described herein are systems and methods for generating blockchain token support from a set of declarations. In accordance with an embodiment, an application builder (App Builder, Application Builder) component of a blockchain, blockchain cloud system, blockchain cloud service (BCS), or other blockchain solution can provide a mechanism to define blockchain assets using a declaration or specification file, and then generate a blockchain smart contract that supports those assets. In accordance with an embodiment, the systems and methods described herein provide a mechanism for defining Tokens (e.g., Fungible or Non Fungible Tokens) adhering to a framework, such as the Token Taxonomy Framework, and generating the appropriate methods as defined by the token properties.

BRIEF DESCRIPTION OF THE DRAWINGS

FIG. 12 illustrates an architecture of a token implemented by an app builder, in accordance with an embodiment.

FIG. 13 is a flowchart of method for generating blockchain token support from a set of declarations, in accordance with an embodiment.

DETAILED DESCRIPTION

Figure 1:
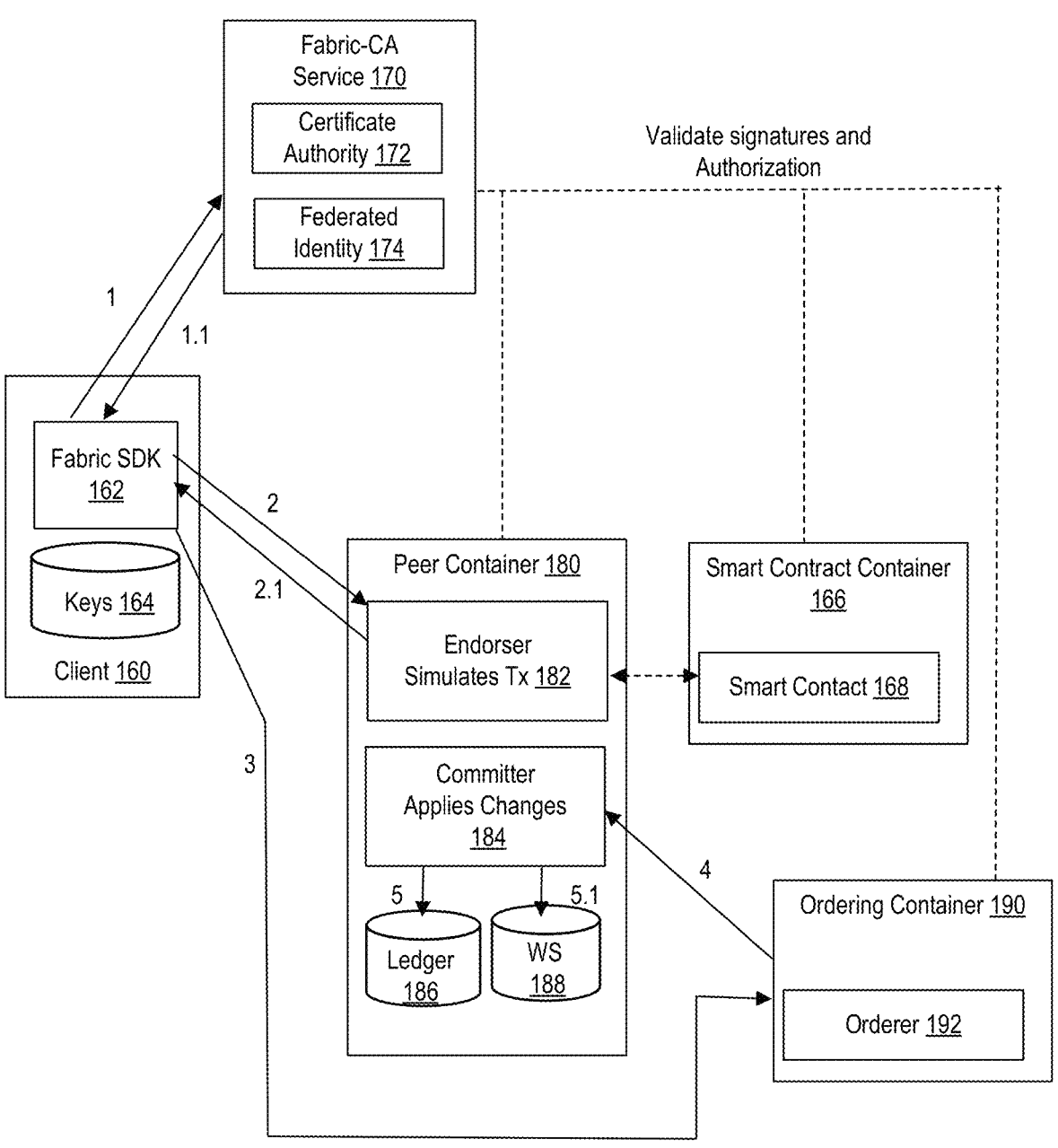
FIG. 1 illustrates transaction flow in a fabric of a Blockchain cloud service system in accordance with an embodiment.

In accordance with an embodiment, described herein are systems and methods for transaction identification generation for transaction-based systems. Such transaction-based systems can include, for example, distributed ledgers, such as blockchains based on, for example, Ethereum, Bitcoin, or Hyperledger . . . etc. In addition, an example blockchain fabric that can utilize the herein described transaction identification for transaction-based systems can be provided as a cloud service, such as a blockchain cloud service. In accordance with an embodiment, an enterprise-grade framework includes scalability, management, configuration, persistence, and compatibility with a diverse range of customer applications through use of cloud technologies. In a particular embodiment, a permissioned blockchain ledger and blockchain fabric are provided as a blockchain cloud service (BCS).

In the following description, the teachings of the present disclosure will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the disclosure.

Furthermore, in certain instances, numerous specific details will be set forth to provide a thorough description of the disclosure. However, it will be apparent to those skilled in the art that the disclosure may be practiced without these specific details. In other instances, well-known features have not been described in as much detail so as not to obscure the disclosure.

The present disclosure is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the disclosure.

Common reference numerals are used to indicate like elements throughout the drawings and detailed description; therefore, reference numerals used in a figure may or may not be referenced in the detailed description specific to such figure if the element is described elsewhere.

Blockchain technology has the potential to dramatically enhance enterprise business value by enabling near real-time, distributed transactions across customers' ecosystems and by enabling secure, tamper-proof data sharing. The Hyperledger Fabric blockchain incorporates modular architecture, horizontal/cross-industry technology support, and support for enterprise needs.

In accordance with an embodiment, while the Hyperledger Fabric is mentioned throughout the following detailed description, one of skill in the art would readily understand that different and varied distributed ledgers, blockchains and/or blockchain fabrics can be used with the disclosed methods and systems. These include, but are not limited to, Ethereum, Quorum, Bitcoin, permissioned and permissionless ledgers.

INTRODUCTION

In accordance with an embodiment, a Hyperledger Fabric is a platform for distributed ledger solutions underpinned by a modular architecture delivering high degrees of confidentiality, resiliency, flexibility and scalability. It is designed to support pluggable implementations of different components and accommodate the complexity and intricacies that exist across the economic ecosystem.

In accordance with an embodiment, a Hyperledger Fabric delivers an elastic and extensible architecture, distinguishing it from alternative blockchain solutions.

Blockchain—A Distributed Ledger

In accordance with an embodiment, a blockchain network can comprise a distributed ledger that records transactions that take place on a network.

A blockchain ledger is often described as decentralized because it is replicated across many network participants, each of whom collaborate in its maintenance. Decentralization and collaboration are attributes that mirror the way businesses exchange goods and services in the real world.

In addition to being decentralized and collaborative, the information recorded to a blockchain is append-only, using cryptographic techniques that guarantee that once a transaction has been added to the ledger it cannot be modified. This property of immutability makes it simple to determine the provenance of information because participants can be sure information has not been changed after the fact. In this way, blockchains can be thought of as systems of proof.

Blockchain—Smart Contracts

In accordance with an embodiment, in order to support the consistent update of information—and to enable certain ledger functions (transacting, querying, etc.)—a blockchain network uses smart contracts to provide controlled access to the ledger.

In accordance with an embodiment, smart contracts are not only a key mechanism for encapsulating information and keeping it simple across the network, they can also be written to allow participants to execute certain aspects of transactions automatically.

A smart contract can, for example, be written to stipulate the cost of shipping an item that changes depending on when it arrives. With the terms agreed to by both parties and written to the ledger, the appropriate funds change hands automatically when the item is received.

Blockchain—Consensus

In accordance with an embodiment, the process of keeping the ledger transactions synchronized across the network—to ensure that ledgers only update when transactions are approved by the appropriate participants, and that when ledgers do update, they update with the same transactions in the same order—can be referred to as consensus.

In accordance with an embodiment, a blockchain can be thought of as a shared, replicated transaction system which is updated via smart contracts and kept consistently synchronized through a collaborative process called consensus.

Advantages of Blockchain

In accordance with an embodiment, the currently available transactional networks are versions of networks that have existed since business records have been kept. The members of a business network transact with each other, but each member maintains separate records of their transactions. As well, objects of the transactions can have their provenance established each time they are sold to ensure that the business selling an item possesses a chain of title verifying their ownership of it.

Despite current business networks being modernized by computing systems, unified systems for managing the identity of network participants do not exist, establishing provenance is laborious as it takes days to clear securities transactions (the world volume of which is numbered in the many trillions of dollars), contracts must be signed and executed manually, and every database in the system contains unique information and therefore represents a single point of failure.

Blockchain, in accordance with an embodiment, provides an alternative to many of the inefficiencies represented by the standard system of transactions, by providing a standard method for establishing identity on the network, executing transactions, and storing data.

In accordance with an embodiment, in a blockchain network, each participant in it has its own replicated copy of the ledger. In addition to ledger information being shared, the processes which update the ledger are also shared. Unlike other systems, where a participant's private programs are used to update their private ledgers, a blockchain system has shared programs to update shared ledgers.

In accordance with an embodiment, with the ability to coordinate business networks through a shared ledger, blockchain networks can reduce the time, cost, and risk associated with private information and processing while improving trust and visibility.

Hyperledger Fabric

Hyperledger Fabric, like other blockchain technologies, has a ledger, uses smart contracts, and is a system by which participants manage their transactions.

Where Hyperledger Fabric differs from some other blockchain systems is that it is private and permissioned. Rather than the "proof of work" some blockchain networks use to verify identity (allowing anyone who meets those criteria to join the network), the members of a Hyperledger Fabric network enroll through a membership services provider.

Hyperledger Fabric also offers several pluggable options. Ledger data can be stored in multiple formats, consensus mechanisms can be switched in and out, and different MSPs (Membership Service Providers) are supported.

Hyperledger Fabric also offers the ability to create channels, allowing a group of participants to create a separate ledger of transactions. This allows for an option for networks where some participants might be competitors and not want every transaction they make-a special price they are offering to some participants and not others, for example—known to every participant. If two participants form a channel, then those participants—and no others—have copies of the ledger for that channel.

Shared Ledger

In accordance with an embodiment, a Hyperledger Fabric has a ledger subsystem comprising two components: the world state (also referred to as the "state of the world" database) and the transaction log. Each participant has a copy of the ledger of every Hyperledger Fabric network they belong to.

The world state component describes the state of the ledger at a given point in time. It is the database of the ledger. The transaction log component records all transactions which have resulted in the current value of the world state. It is the update history for the world state. The ledger, then, is a combination of the world state database and transaction log history.

The shared ledger has a replaceable data store for the world state. By default, this is a LevelDB key-value store database. The transaction log does not need to be pluggable. It simply records the before and after values of the ledger database being used by the blockchain network.

Smart Contracts

Hyperledger Fabric smart contracts are written in chaincode and are invoked by an application external to the blockchain when that application needs to interact with the ledger. In most cases chaincode only interacts with the database component of the ledger, the world state (querying it, for example), and not the transaction log.

Consensus

In accordance with an embodiment, transactions are written to the ledger in the order in which they occur, even though they might be between different sets of participants within the network. For this to happen, the order of transactions is established and a method for rejecting bad transactions that have been inserted into the ledger in error (or maliciously) can be put into place.

Hyperledger Fabric allows a network entity (e.g., a network user, peer, starter) to select a consensus mechanism that best represents the relationships that exist between participants. As with privacy, there is a spectrum of needs; from networks that are highly structured in their relationships to those that are more peer-to-peer.

Chaincode

In accordance with an embodiment, chaincode can comprise software defining an asset or assets, and the transaction instructions for modifying the asset(s)—it is the business logic. Chaincode enforces the rules for reading or altering key value pairs or other state database information. Chaincode functions execute against the ledger current state database and are initiated through a transaction proposal. Chaincode execution results in a set of key value writes (write set) that can be submitted to the network and applied to the ledger on all peers.

Ledger Features

In accordance with an embodiment, a ledger is the sequenced, tamper-resistant record of all state transitions in the fabric. State transitions are a result of chaincode invocations ('transactions') submitted by participating parties. Each transaction results in a set of asset key-value pairs that are committed to the ledger as creates, updates, or deletes.

The ledger is comprised of a blockchain to store the immutable, sequenced record in blocks, as well as a state database to maintain current fabric state. There can be one ledger per channel, with each channel comprising a separate ledger of transactions visible to a particular group of participants. Each peer maintains a copy of the ledger for each channel of which they are a member.

Privacy Through Channels

In accordance with an embodiment, Hyperledger Fabric employs an immutable ledger on a per-channel basis, as well as chaincodes that can manipulate and modify the current state of assets (i.e., update key value pairs). A ledger exists in the scope of a channel—it can be shared across the entire network (assuming every participant is operating on one common channel)—or it can be privatized to only include a specific set of participants.

In the latter scenario, such participants can create a separate channel and thereby isolate/segregate their transactions and ledger. In order to allow for scenarios that want to bridge the gap between total transparency and privacy, chaincode can be installed only on peers that need to access the asset states to perform reads and writes (e.g., if a chaincode is not installed on a peer, it will not be able to properly interface with the ledger). To further obfuscate the data, values within chaincode can be encrypted (in part or in total) using common cryptographic algorithms such as AES (Advanced Encryption Standard) before appending to the ledger.

In accordance with an embodiment, privacy can also be improved with the notion of "private collections"—which are a finer grain concept than privacy by channels.

Security and Membership Services

In accordance with an embodiment, Hyperledger Fabric provides for a transactional network where all participants have known identities. Public Key Infrastructure is used to generate cryptographic certificates which are tied to organizations, network components, and end users or client applications. As a result, data access control can be manipulated and governed on the broader network and on channel levels. This "permissioned" notion of Hyperledger Fabric, coupled with the existence and capabilities of channels, helps address scenarios where privacy and confidentiality are paramount concerns.

Consensus

In accordance with an embodiment, in a distributed ledger, consensus can encompass more than simply agreeing upon the order of transactions. This differentiation is highlighted in Hyperledger Fabric through its fundamental role in the entire transaction flow, from proposal and endorsement, to ordering, validation and commitment. Consensus can be defined as the full-circle verification of the correctness of a set of transactions comprising a block.

Consensus is ultimately achieved when the order and results of a block's transactions have met the explicit policy criteria checks. These checks and balances take place during the lifecycle of a transaction, and include the usage of endorsement policies to dictate which specific members must endorse a certain transaction class, as well as system chaincodes to ensure that these policies are enforced and upheld. Prior to commitment, the peers can employ these system chaincodes to make sure that enough endorsements are present, and that they were derived from the appropriate entities. Moreover, a versioning check can take place during which the current state of the ledger is agreed or consented upon, before any blocks containing transactions are appended to the ledger. This final check provides protection against double spend operations and other threats that might compromise data integrity, and allows for functions to be executed against non-static variables.

In addition to the endorsement, validity and versioning checks that take place, there are also ongoing identity verifications happening in the transaction flow. Access control lists are implemented on hierarchal layers of the network (ordering service down to channels), and payloads are repeatedly signed, verified and authenticated as a transaction proposal passes through the different architectural components. Consensus is not limited to the agreed upon order of a batch of transactions, but rather, it is a process that is achieved as a byproduct of the ongoing verifications that take place during a transaction's flow from proposal to commitment.

Blockchain Cloud Service—Architecture

In accordance with an embodiment, a system, such as a cloud system (e.g., blockchain cloud service (BCS)), can utilize the above described Hyperledger Fabric as a starting point. Such a system offers a highly advanced and differentiated enterprise-grade distributed ledger cloud platform that allows for the building of new blockchain-based applications and/or the extension of existing Software as a Service (SaaS), Platform as a Service (PaaS), and infrastructure as a Service (IaaS), and on-premises applications.

In accordance with an embodiment, the system can support mission-critical enterprise needs such as scalability, security, robustness, integration, and performance to remove barriers to adoption and support blockchain applications in production. The system allows for users to deploy, configure, manage and monitor blockchain and reduce the cost for deploying blockchain in enterprises by providing a blockchain cloud service as a Platform as a Service (PaaS) Cloud solution. The system also accelerates the development and integration of blockchain applications with other platforms. The system allows SaaS cloud customers to enable their enterprise processes like Procurement, Payments, Trade Finance, Accounting, HR, CX to securely share data and conduct distributed transactions with third party applications and external distributed ledger technologies using blockchain cloud platform.

In accordance with an embodiment, the system comprises a cloud service based on a PaaS manager (e.g., PaaS Service Manager (PSM) platform). In general, such a system comprises a managed cloud service that runs in compute space (e.g., external compute space). In some embodiments, the system utilizes features of the PSM platform including container services (e.g., Oracle Application Container Cloud Service (ACCS), an identity service (e.g., Oracle Identity Cloud Service (IDCS)), a load balancer, such as a load balancer as a service (e.g., Oracle Load Balancer as a Service (LBaaS)), a data platform service (e.g., Oracle Event Hub Cloud Service), and cloud storage. Each customer blockchain can be provisioned, and can be run as a tenant. The system supports multiple blockchains, each provisioned and running as a separate tenant in a multitenant environment.

Accordingly, the system allows for applications or customer applications to implement a distributed ledger with smart contracts as necessary or desirable for the applications. Clients and users of such a system can be internal or external to cloud—blockchain trust—some blockchain networks may comprise components outside the cloud environment (or could be constrained to a particular cloud).

In accordance with an embodiment, such a system can be useful for a wide variety of application functions in particular in multi-party transactions where trust and identity issues are to be resolved. The disclosed system blockchain service is not necessarily anonymous. Identity and auditability are integrated elements. Accordingly BCS finds applications in, for example, capital markets, cross-border transactions, financial services, asset transactions, legal regulatory applications, healthcare records, publishing, logistics, traceability, and anti-counterfeiting.

As described above, each party on a blockchain has access to the entire database and its complete history (unless the ledger has been provisioned/privatized to certain parties). No single party controls the data or the information. Every party can also verify the records of its transaction partners directly, without an intermediary. Communication occurs directly between peers instead of through a central node. Each node stores and forwards information to all other nodes. Once a transaction is entered in the database and the accounts are updated, the records cannot be altered, because they are linked to every transaction record that came before them (hence the term "chain"). If a transaction is in error, a new transaction must be used to reverse the error, and both transactions are then visible to provisioned users. To add a new valid transaction, participants can agree on its validity via a consensus mechanism. Participants in the blockchain can, for example, certify where the asset came from and how the ownership of the asset has changed over time. A digital signature can be used to authenticate document and can be placed in Access Control [varied level of permissions] and Programmability [Executable Business rules].

In many multi-party transactions, money is exchanged, when a party receives the assets or services. Typically because of transaction time, one or other party must commits goods or money before the other. In some environments, trust issues are resolved by using an intermediary which holds funds in escrow until completion of conditions in the contract. This resolves trust issues between the original parties. However, such a method adds another centralized party which must be trusted, increasing complexity, and likely the cost of the transaction. Use of smart contracts as part of the provided system can eliminate the need for intermediary—parties can conduct trusted transactions on the blockchain without having an intermediary.

In accordance with an embodiment, advantages of the provided system, such as BCS, include that the information contained therein is distributed. Access is controlled and privacy can be maintained although auditability is available. Moreover, the blockchain ledger is essentially immutable and cannot be repudiated. The ledger comprises of a list of blocks. Each transaction block contains: Block ID, Previous Hash, Data Hash, Timestamp, Transaction ID List, Actions (1 . . . n), Chaincode ID, Chaincode proposal, Response (r/w set, events, success or failure), Endorsers. As each block contains the previous hash and its own hash, the blocks are inherently ordered and immutable once known/distributed (note: the hash of a present block is a hash of the hash of the previous block and the other data in the present block, hence linking the blocks in a chain). A consensus can resolve discrepancies. Compared to a centralized database or inter-mediary, there is no need to give undue authority to a centralized authority. The distributed nature of the ledger also augments the fundamental immutability of the block-chain recording technology in that the use of distributed copies—and consensus make it difficult to modify (even where algorithmically possible). Thus, given the ordering of transactions-hacking a ledger is nearly impossible if some-body has a copy of the latest block in the chain.

In particular embodiments, as described below, the pro-vided system can be based on the PaaS (such as Oracle PaaS Service Manager (PSM)) and is augmented with a manage-ment console which simplifies/facilitates/automates provi-sioning, monitoring and configuration of fabric based block-chains. Additionally, a REST (representational state transfer) proxy service including a unitary REST API is provided to simplify contact between applications and the Blockchain fabric. Developers can build smart contracts, use the man-agement console to deploy the smart contracts, and then let the applications invoke the smart contract on the blockchain either asynchronously (which is the default) or synchronous (if an immediate response is desired). The REST proxy service and API provides both synchronous and asynchro-nous capabilities depending on the needs of the platform.

In accordance with an embodiment, a Fabric-CA (Fabric Certificate Authority) server can provide a membership service for a fabric. The Fabric-CA server can comprise three parts: authentication for user, authorization for access-ing a Blockchain (a group of peers and orders) and a CA server which could deliver certificate to application client, peer and order. Fabric-CA can utilize a certificate to imple-ment authentication and authorization. The certificate include two types: enroll certificate for authentication and transaction certificate for authorization. In accordance with an embodiment, an identity service, such as IDCS, can also provide authentication and authorization.

Hyperledger Fabric

As described above, in an embodiment, the provided system can implement a Hyperledger Fabric providing a distributed ledger platform for running smart contracts. The fabric leverages container technology to host smart contracts called "chaincode" that comprise the application logic of the system. In alternative embodiments the Block Chain Cloud Service implements alternative distributed ledger platforms including for example, the "Tendermint" ledger system as described in U.S. patent application Ser. No. 15/169,622, entitled "Accountability And Trust In Distributed Ledger Systems", filed May 31, 2016, which is incorporated by reference.

The distributed ledger protocol of the Hyperledger Fabric is run by peers. One disadvantage of prior blockchain technologies is that all peers are required to record all transactions. This creates substantial I/O and processor overhead and does not conveniently scale to enterprise-grade systems. The Hyperledger Fabric distinguishes between two kinds of peers. A committer peer is a node on the network that can verify endorsements and validate transaction results prior to committing transactions to the blockchain and maintain the ledger. On the other hand, a non-validating peer is a node that functions as a proxy to connect clients (issuing transactions) to validating peers. A non-validating peer (or an endorsing peering) does not execute transactions but it may simulate and endorse them. The segregation of peer types/function improves the scal-ability of the system. An ordering service can accept endorsed transactions, order them into a block, and deliver the blocks to committing peers. In such distributed ledger systems, consensus is the process of reaching agreement on the next set of transactions to be added to the ledger. In Hyperledger Fabric, consensus is made up of three distinct steps: transaction endorsement, ordering, and validation and commitment.

In accordance with an embodiment, a feature of Hyperledger is permissioned blockchain with immediate finality which runs arbitrary smart contracts called chain-code. The defined chaincode smart contracts are encapsu-lated in a container and system chaincode runs in the same process as the peer. Chaincode execution is partitioned from transaction ordering, limiting the required levels of trust and verification across node types, and reducing network over-head.

In accordance with an embodiment, channels in the Hyperledger Fabric enable multi-lateral transactions with high degrees of privacy and confidentiality required by competing businesses and regulated industries that exchange assets on a common network. The immutable, shared ledger encodes the entire transaction history for each channel, and includes query capability for efficient auditing and dispute resolution. A ledger is provided in the scope of a channel—it can be shared across the entire network (assuming every participant is operating on one common channel)—or it can be privatized to only include a set of participants.

In accordance with an embodiment, the Hyperledger Fabric implements security through support for certificate authorities (CAs) for TLS (transport layer security) certifi-cates, enrollment certificates and transaction certificates. Public Key Infrastructure is used to generate cryptographic certificates which are tied to organizations, network com-ponents, and end users or client applications. As a result, data access control can be manipulated and governed on the broader network and on channel levels. This "permissioned" feature of Hyperledger Fabric, coupled with the existence and capabilities of channels, satisfies privacy and confiden-tiality needs in multi-party enterprise systems.

In accordance with an embodiment, Hyperledger Fabric provides the ability to modify assets using chaincode trans-actions. As described above, chaincode is software defining an asset or assets, and the transaction instructions for modi-fying the asset(s).

Integrated consensus mechanisms have a fundamental role in transaction flow in the Hyperledger Fabric, from proposal and endorsement, to ordering, validation and com-mitment. Consensus is, as described above, a verification of the validity of a set of transactions comprising a block. Consensus is ultimately achieved when the order and results of a block's transactions have met the explicit policy criteria checks.

FIG. 1 illustrates transaction flow in a fabric of a system providing a blockchain service. More specifically, the figure illustrates a blockchain cloud service (BCS) system in accordance with an embodiment. At 1, Client 160 uses fabric SDK 162 to access Fabric certificate authority 170, 172, 174 to enroll. At 1.1 Fabric-CA returns an enrollment certificate to the client 160. At 2, Client 160 uses fabric SDK 162 to access Peer container 180 requesting endorsement from Endorser 182. At 2.1 Endorser 182 returns a signed RWset (read/write set). At 3, the fabric SDK 162 at the client 160 submits the endorsed TX (transaction) which includes RWset and endorser signatures to the ordering service at the ordering container 190. At 4, Orderer 192 delivers the TX batch to Committer 184 in peer container 180. The Orderers are a defined collection of nodes that orders transactions into a block. The ordering service exists independent of the peer processes and orders transactions on a first-come-first-serve basis for all channels on the network. Committer 184 applies changes to ledger 186 and World State 188 at 5 and 5.1. The Fabric certificate authority 170 can be used to validate signatures and authorization for the peer container 180, the smart contract container 166 and 168 (smart contract), and the orderer 192. In addition, the smart contract 168 can communicate with the endorser 182.

In an embodiment, the system can utilize a Kafka cluster as an ordering service. Kafka is a distributed streaming service that supports publish and subscribe semantics. A Kafka cluster runs on a plurality of servers and stores streams of records in categories called topics. Each record comprises a key, a value, and a timestamp. Kafka can thus be used as an ordering service comprising ordering service nodes (OSN-n), and a Kafka cluster. The ordering service client can be connected to multiple OSNs. The OSNs do not communicate with each other directly. These ordering service nodes (OSNs) (1) do client authentication, (2) allow clients to write to a chain or read from it using a simple interface, and (3) they also do transaction filtering and validation for configuration transactions that either reconfigure an existing chain or create a new one. Messages (records) in Kafka get written to a topic partition. A Kafka cluster can have multiple topics, and each topic can have multiple partitions. Each partition is an ordered, immutable sequence of records that is continually appended to. Once the OSNs have performed client authentication and transaction filtering, they can relay the incoming client transactions belonging to a certain chain to the chain's corresponding partition. They can then consume that partition and get back an ordered list of transactions that is common across all ordering service nodes.

In accordance with an embodiment, each peer has the capability to be an endorser and a committer. There is a configuration item (e.g., CORE_PEER_ENDORSER_ENABLED) which can enable a peer to be an endorser. When a peer joins a channel, this peer becomes a committer of this channel. When a chaincode is installed on a peer, this peer becomes the candidate endorser for this chaincode. When a client proposes a transaction, it is the client's choice to select which peers to be the endorsers (from the candidate endorsers).

In accordance with an embodiment, the ordering mechanism for Orderer delivering blocks to Peer is as follows. First, a peer (e.g., a leader peer) delivers a request for new blocks from Orderer by sending its version (the last block number). Next, an Orderer checks Peer's version: a) if it is greater than Orderer, returns an error to Peer, it indicates the ledger in Order are lost, and cannot be recovered from EventHub (in this scenario, Orderer cannot continue to work properly); b) if the peer's version is less than Orderer, then Orderer retrieves blocks from local ledger, either in RAM or local file, and send back to peer; or c) if they have the same version, then Orderer blocks until new blocks are available. When a new block data cut from EventHub is ready, the Orderer will put it into local block file or RAM, then deliver thread reads this block from ledger and sends it back to peer. The peer gets this block, and commits it to local ledger, and can then broadcast its latest version to other peers.

BCS System Architecture

Figure 2:
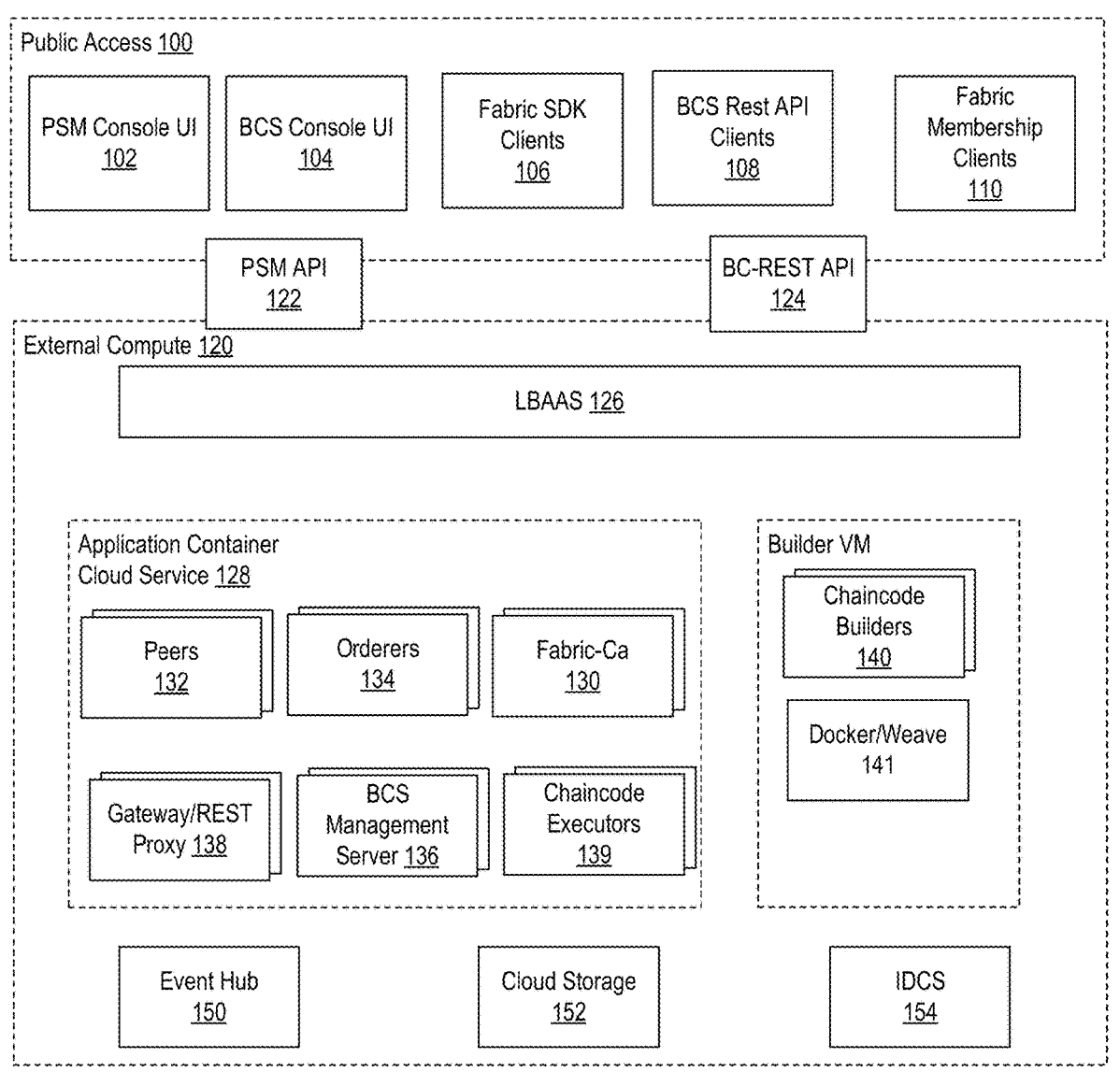
FIG. 2 illustrates a Blockchain cloud service system in accordance with an embodiment.

FIG. 2 illustrates a blockchain cloud service system in accordance with an embodiment. As shown, the Blockchain cloud service components are provisioned in compute space 120 (e.g., external compute space). This can be a platform provider, (e.g., Oracle PaaS Service Manager (PSM) platform). Access to the system is mediated by the PSM API 122 and Blockchain REST API 124. Compute space 120 leverages a load balancing as a service LBaaS 126 to distribute incoming transactions across the available appropriate resources.

In accordance with an embodiment, the BCS is an application-container layered service built with PSM platform on Application Container Cloud Service 128. Each of the BCS entities runs on a separate container, thus allowing multiple BCS entities to run simultaneously and independently. Each BCS entity is one-to-one correspondence to an application container. The blockchain cloud service implements features of the Hyperledger Fabric described above. Besides the components that construct the basic fabric network, several components are developed to leverage the Hyperledger Fabric into the blockchain cloud service. These components need separate deployment behaviors and binaries to deploy. A Cloud Stack Manager can be used to automate the provisioning of all services defined by the blueprint as a single unit that is called a stack.

In an embodiment, the BCS provides an implementation of the Hyperledger Fabric which is an implementation of a distributed ledger platform for running smart contracts. The BCS leverages container technology to host smart contracts called "chaincode" that comprise the application logic of the system.

In accordance with an embodiment, the distributed ledger protocol of the fabric is run by peers. The fabric distinguishes between two kinds of peers: A validating peer is a node on the network responsible for running consensus, validating transactions, and maintaining the ledger. On the other hand, a non-validating peer is a node that functions as a proxy to connect clients (issuing transactions) to validating peers. A non-validating peer does not execute transactions but it may verify them. Some key features of the fabric release include permissioned blockchain with immediate finality which runs smart contracts called chaincode. The user-defined chaincode smart contracts are encapsulated in a container and system chaincode runs in the same process as the peer. The fabric implements a consensus protocol and security through support for certificate authorities (CAs) for TLS certificates, enrollment certificates and transaction certificates.

In accordance with an embodiment, the BCS entities run in layered container instances with ACCS 128. The containers are created and/or started by provisioning operations of the PSM. The Fabric-CA Container 130, is the container in which the BCS Fabric CA (Certificate and Authority) component is provided. The BCS Peer (Container) 132 is the container in which the BCS peer network entity that maintains a ledger and runs chaincode containers in order to perform the read/write operations to the ledger component. The BCS Orderer Container 134 is the container in which the BCS orderer runs, which provides the service to order transactions into a blockchain for all of channels is running. The BCS Chaincode Execution Container 139 is a container created and started by the peer entity. In the container, the chaincode execution unit communicates with the parent peer entity and performs encoding of assets and transaction instructions for modifying the assets in the blockchain.

In accordance with an embodiment, the BCS Chaincode Builder Container 140 is a container created and started by the peer entity. In the container, the chaincode build environment is installed and deployed, and the chaincode execution unit is built therein. A client side Fabric SDK 106 provides functionality for accessing the BCS. The Block Chain Cloud Service also leverages a data platform such as Event Hub Cloud Service 150, Cloud Storage Service 152, and Identity Service 154. A clouds storage service is used as the storage service for BCS.

In accordance with an embodiment, Docker/Weave 141 are container services. Containers provide a way to package software in a format that can run isolated on a shared operating system. Unlike VMs (virtual machines), containers do not bundle a full operating system—instead using libraries and settings required to make the software work as needed. This makes for efficient, lightweight, self-contained systems and guarantees that software will always run the same, regardless of where it's deployed.

In accordance with an embodiment, each BCS instance comprises of different types of nodes. There can be few (e.g., 0 or more) to multiple peer nodes in a BCS instance. There can be few (e.g., 0) to multiple orderer nodes in a BCS instance. There are 1 to multiple Fabric-CA nodes in a BCS instance, one per VM. BCS Gateway: There can be few (e.g., 0) to multiple BCS gateways in a BCS instance. BCS console is also a component of a BCS instance. There is only one BCS console in a BCS instance.

In accordance with an embodiment, the BCS Management Server (Console) 136 is a component of BCS, which provides rich monitor, management, and view functionalities to the BCS stack instance as described in more detail below. BCS Gateway (REST proxy) 138 is a component of BCS, and provides a REST API interface to customers/clients and is used to access the fabric to perform transactions as described in more detail below.

In accordance with an embodiment, on the public access client-side 100, A PSM Console UI 102 allows for management of Platform Service Manager. A BCS Console UI 104 allows for control of the BCS Management Server. A variety of different client types can access the BCS service including Fabric SDK clients 106, BCS REST Clients 108, and Fabric Membership Clients 110.

In accordance with an embodiment, blueprints can be defined for each type of container listed of above as an individual service type. A Cloud Stack Manager uses the blueprints to automate the provisioning of all of individual service types into a single stack unit. The benefit of defining a service type for each BCS entity is ease of upgrading and maintaining the various running entities. The application container layered service supports four types of operations: CREATE_SERVICE, DELETE_SERVICE, SCALE_SERVICE, and Start/Stop/Restart. These operations can be applied service by service.

In accordance with an embodiment, in the Hyperledger Fabric Network, the ordering service component uses the Apache Kafka to provide ordering service and support for multiple chains in a crash fault tolerant manner. Accordingly, in the blockchain cloud service, the ordering service component uses a data platform (e.g., Oracle Event Hub Cloud Service that delivers the power of Kafka as a managed streaming data platform and can be integrated with the rest of Oracle's cloud.)

Figure 3:
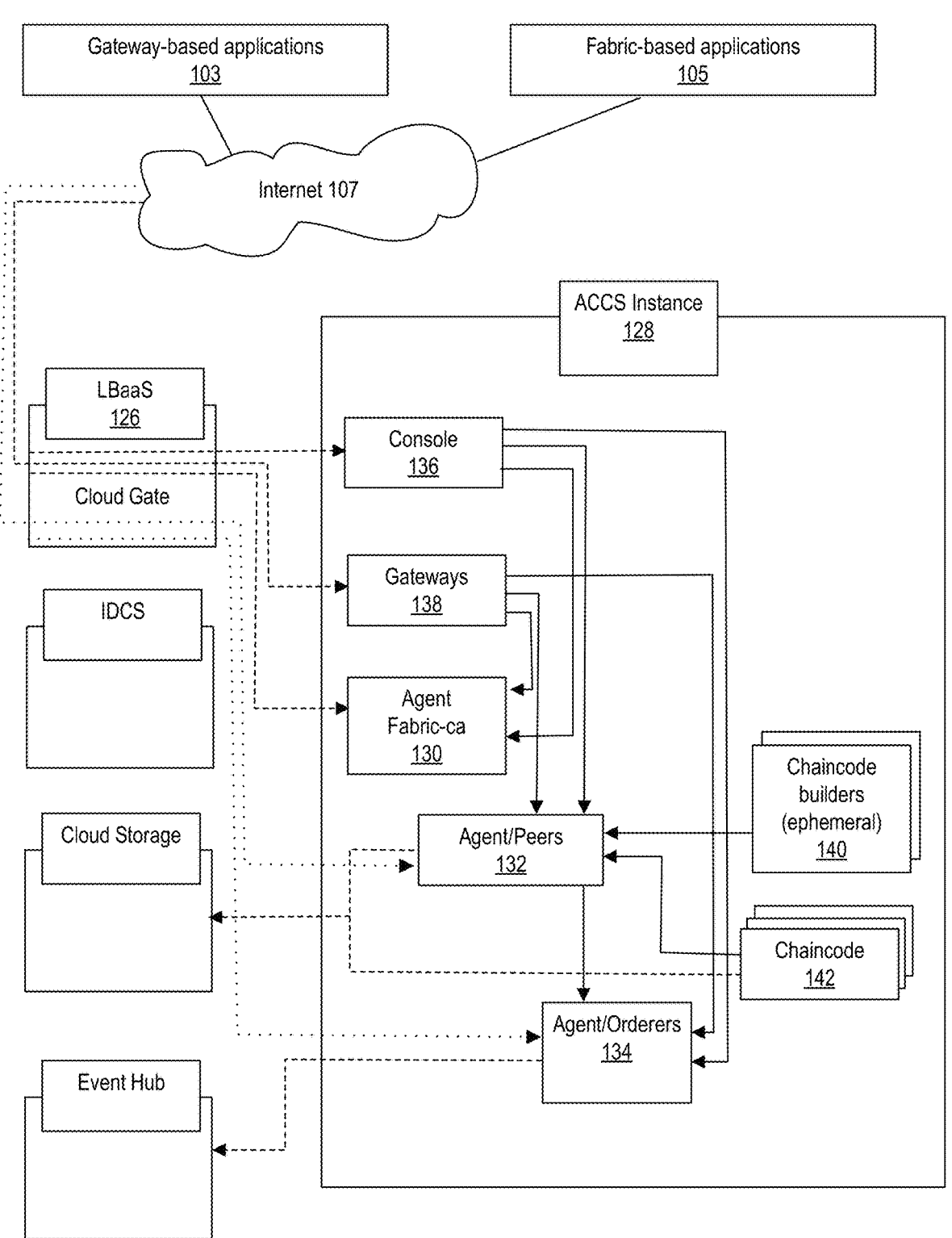
FIG. 3 illustrates an example BCS system in accordance with an embodiment.

FIG. 3 illustrates an example BCS system in accordance with an embodiment. More specifically, the figure shows a BCS runtime.

In accordance with an embodiment, clients, such as gateway-based applications 103 and/or fabric-based applications 105 can communicate with an AACS instance 128, via a network, such as the internet 107, and via a front end, such as a load balancer LBaaS 126 (e.g., CloudGate). Incoming calls can comprise REST communication (shown as the heavier dashed line in the figure), or, in certain situations, incoming gRPC communication (shown as the lighter dashed line in the figure). Incoming REST communication can be directed to a gateway 138 (which can comprise a REST API/REST Proxy), a console 136, or an Agent Fabric-CA 130 (as discussed above). The REST communication, now transformed/translated to internal calls (gRPC), can interface with the instance of the blockchain fabric/Hyperledger (including the agent/peers 132, agent/orderers 134, chaincode 142, and chaincode builders 140). Meanwhile, incoming gRPC communication can be directly transmitted to, for example, the agent/peers 132, and the agent/orderers 134, to interface with the blockchain/Hyperledger.

In accordance with an embodiment, once transactions within the ACCS instance have occurred, the ACCS instance can then, for example, persist the ledger at the cloud storage via REST communication, or can communicate with the Event Hub, likewise via REST communication.

In accordance with an embodiment, while only one ACCS instance is shown in the figure, one of skill in the art would readily understand that there can exist one or multiple ACCS instances that the clients (such as gateway-based applications 103 and/or fabric-based applications 105) can communicate with via the described BCS runtime.

Figure 4:
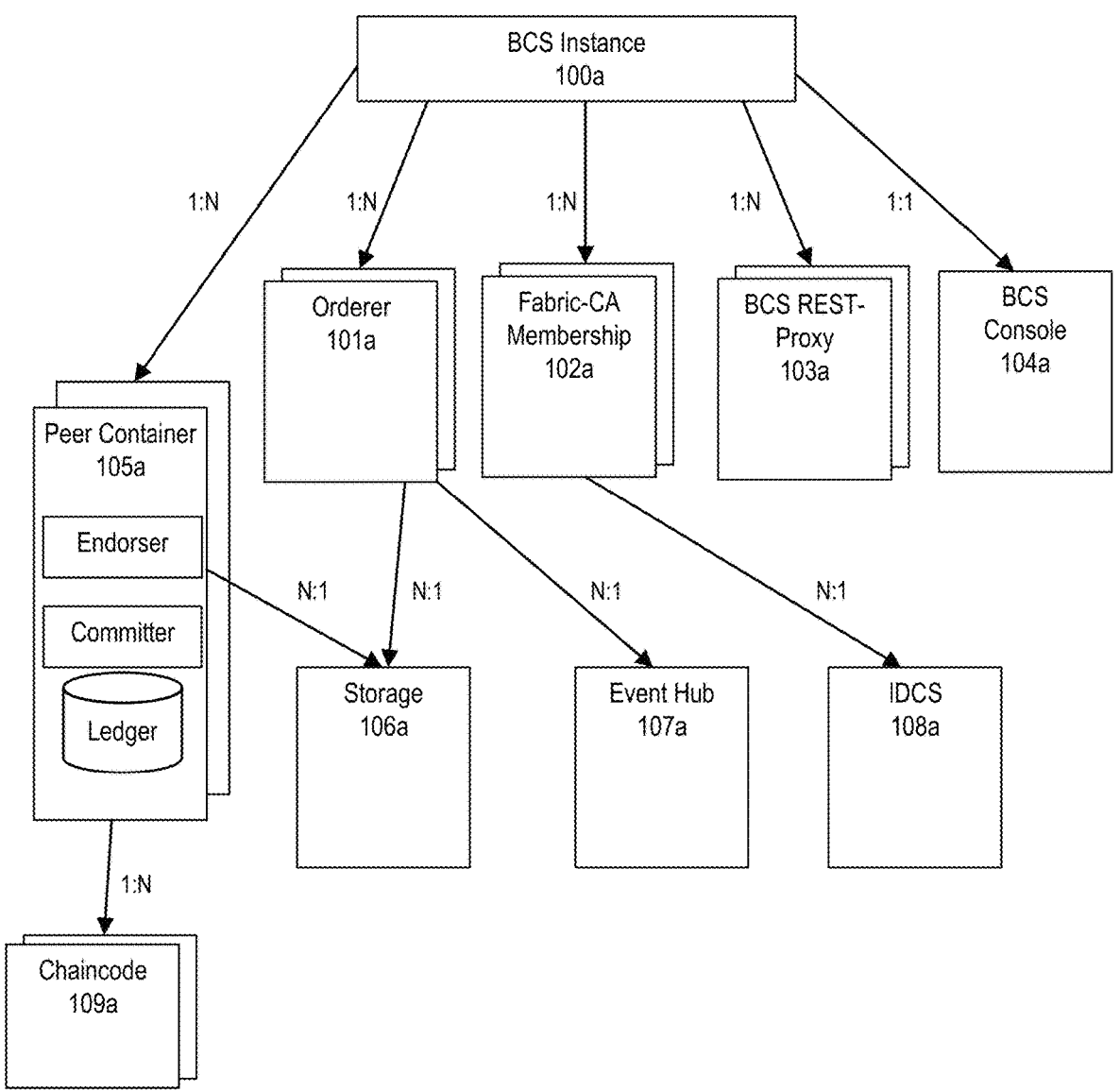
FIG. 4 illustrates an example BCS system in accordance with an embodiment.

FIG. 4 illustrates an example BCS system in accordance with an embodiment. More particularly, the figure shows the component cardinality within a BCS system, namely ratios of components with respect to each BCS instance.

In accordance with an embodiment, for each BCS instance 100a: an orderer 101a can be provided in the ratio of 1:N; a Fabric-CA membership 102a can be provided in a ratio of 1:N; a BCS REST-Proxy 103a can be provided in the ratio of 1:N; a BCS console 104a can be provided in a ratio of 1:1, and a peer container 105a can be present in the ratio of 1:N.

Each peer container can comprise an endorser, which can simulate a transaction, and a committer, which can apply changes to a ledger, which is also provided at the peer container.

In accordance with an embodiment, chaincode 109a can be provided at a ratio of 1:N with respect to the peer container. In addition, storage 106a can be provided at a ratio of N:1 with respect to the peer container and the orderer. As well, even Hub 107a can be provided at a ratio of N:1 with respect to the peer container and the orderer. IDCS 108a can be provided at a ratio of N:1 with respect to the Fabric-CA membership.

Chaincode (Smart Contract) Container

In accordance with an embodiment, and as discussed above chaincode is software defining an asset or assets, and the transaction instructions for modifying the asset(s). Chaincode enforces the rules for reading or altering key value pairs or other state database information. Chaincode functions execute against the ledger current state database and are initiated through a transaction proposal. Chaincode execution results in a set of key value writes (write set) that can be submitted to the network and applied to the ledger on all peers.

In accordance with an embodiment, to support the consistent update of information—and to enable a number of ledger functions (transacting, querying, etc.)—a blockchain network uses smart contracts to provide controlled access to the ledger. Smart contracts can encapsulate information, replicate it automatically across the fabric, and they can also be written to allow participants to execute certain aspects of transactions automatically.

In accordance with an embodiment, Hyperledger Fabric smart contracts are written in chaincode and are invoked by an application external to the blockchain when that application needs to interact with the ledger. In most cases, chaincode interacts with the database component of the ledger, the world state (querying it, for example), and not the transaction log.

In accordance with an embodiment, Hyperledger Fabric utilizes a container engine (e.g., Docker) to build chaincode, deploy it and keep it running. This section describes the fabric architecture and how it is integrated into an ACCS layered model for BCS.

In accordance with an embodiment, fabric deploys and manages user chaincode as follows: First, the chaincode is built in an ephemeral CC env container. Second, the chaincode is transferred as source code into the builder container, compiled with needed libraries statically linked ("Java build"), then the binary is sent back to the peer. The static link allows the actual chaincode container to be as small as possible. Third, a chaincode image and an associated container are built and started. The chaincode container then remains running until the peer is shut down or the channel terminated. Should the chaincode container crash or be killed, if the image exists it is re-started on the next invocation. The design is to have one chaincode Docker container per peer and channel. Chaincode is explicitly installed on peers. That is, not all peers that join a channel necessarily have chaincode installed.

In accordance with an embodiment, users can deploy a fabric network in ACCS layered containers, which have the ability to transparently distribute components such as peers, orderers and chaincode. Chaincode runtime environment containers (ccenv) can be dynamically started as ACLS (access control lists) containers. Chaincode binary can be saved in Cloud Storage since local block storage is not considered a reliable way of recovering. Once built chaincode binaries can be uploaded to Cloud Storage for recovery purposes in case of container crash.

In accordance with an embodiment, each chaincode interaction can correspond to various functions of chaincode. The only restriction is that chaincode cannot be invoked or queried until it is instantiated. Additionally, upon any invocation the chaincode container is re-started if it cannot be found running.

Application Builder

In accordance with an embodiment, an application builder (also referred to herein as "app builder" or "Blockchain App Builder") can be provided within or associated with a blockchain environment, such as the blockchain could service described above. Blockchain App Builder is a tool set that assists with rapid development, testing, debugging, and deployment of chaincode on blockchain platform networks, such as cloud BaaS (Blockchain as a Service) nodes on blockchain cloud service infrastructure and/or on-premises nodes.

In accordance with an embodiment, as described above, a smart contract (also known as a chaincode) defines the different states of an object between two or more parties and logic that validates and implements changes as the object moves between these different states. At the heart of every blockchain application is one or more chaincodes. Thus, it is important that a chaincode should be bug-free and tested before it is deployed and instantiated.

In accordance with an embodiment, an app builder can be provided to allow users and developers to generate complex chaincodes from a simple configuration file and assets specification in a easy to understand and utilize langue, such as TypeScript (for node.js chaincode) and Go (for golang chaincode) from a simple specification file. With the specification file, users and developers can specify multiple asset definitions and behaviors. The users and developers can then generate and test chaincodes (e.g., either on a local machine or utilizing a connection to a blockchain cloud service).

In accordance with an embodiment, the Blockchain App Builder supports the full development lifecycle by utilizing, e.g., a command line interface or an extension.

Figure 5:
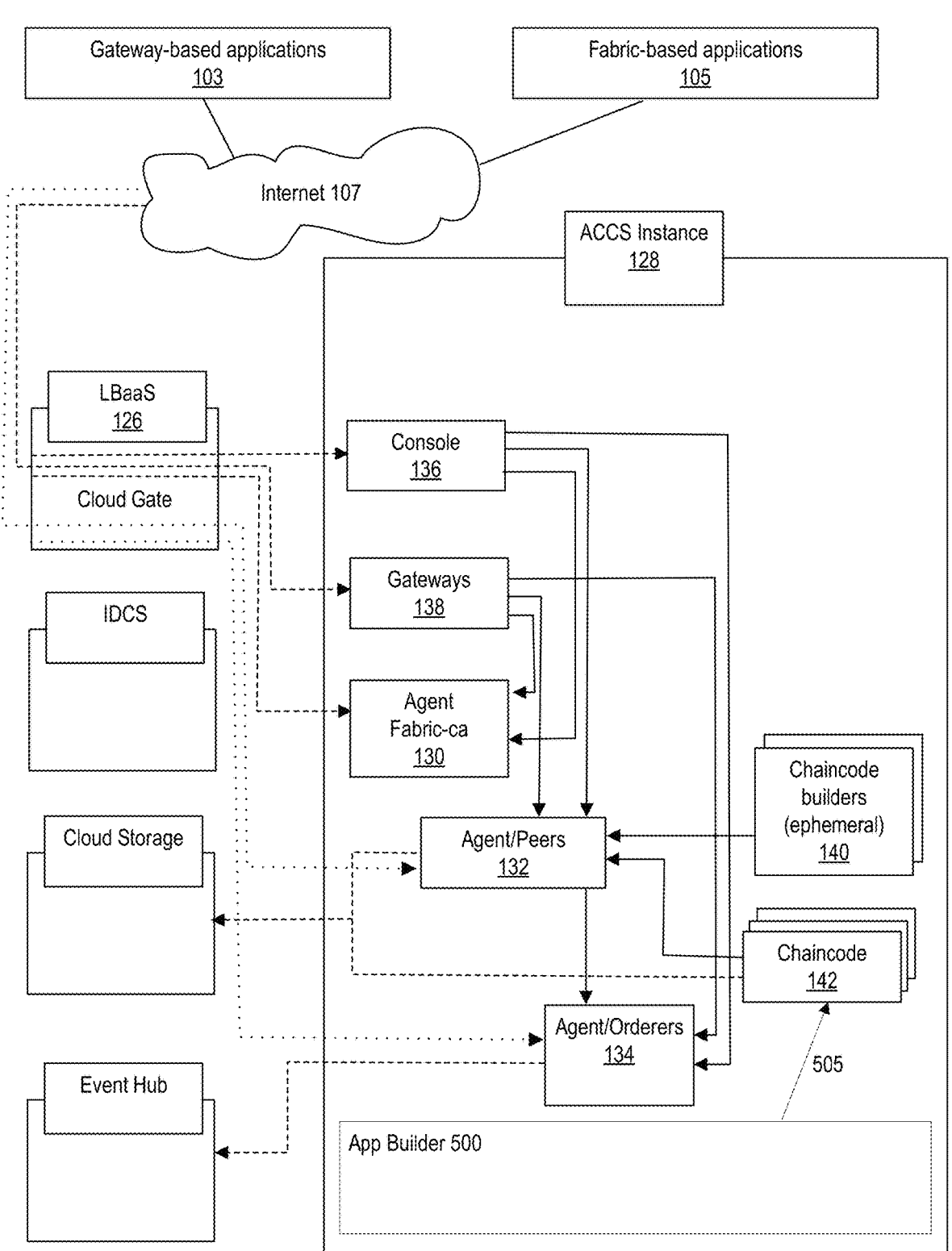
FIG. 5 illustrates an example BCS system in accordance with an embodiment.

FIG. 5 illustrates an example BCS system in accordance with an embodiment. More specifically, the figure shows a BCS runtime with an app builder.

In accordance with an embodiment, clients, such as gateway-based applications 103 and/or fabric-based applications 105 can communicate with an AACS instance 128, via a network, such as the internet 107, and via a front end, such as a load balancer LBaaS 126 (CloudGate). Incoming calls can comprise REST communication (shown as the heavier dashed line in the figure), or, in certain situations, incoming gRPC communication (shown as the lighter dashed line in the figure). Incoming REST communication can be directed to a gateway 138 (which can comprise a REST API/REST Proxy), a console 136, or an Agent Fabric-CA 130 (as discussed above). The REST communication, now transformed/translated to internal calls (gRPC), can interface with the instance of the blockchain fabric/Hyperledger (including the agent/peers 132, agent/orderers 134, chaincode 142, and chaincode builders 140). Meanwhile, incoming gRPC communication can be directly transmitted to, for example, the agent/peers 132, and the agent/orderers 134, to interface with the blockchain/Hyperledger.

In accordance with an embodiment, once transactions within the ACCS instance have occurred, the ACCS instance can then, for example, persist the ledger at the cloud storage via REST communication, or can communicate with the Event Hub, likewise via REST communication.

In accordance with an embodiment, while only one ACCS instance is shown in the figure, one of skill in the art would readily understand that there can exist one or multiple ACCS instances that the clients (such as gateway-based applications 103 and/or fabric-based applications 105) can communicate with via the described BCS runtime.

In accordance with an embodiment, provisioned as part of, or in conjunction with, an ACCS instance, a user or developer can be provided with access to an app builder 500. While shown as being a part of the ACCS instance in the figure, one of ordinary skill in the art would readily understand that the app builder can be provided as a separate, standalone tool that can interact with an ACCS instance.

In accordance with an embodiment, the app builder 500 can be utilized by a user or developer to build, test, and deploy 505 chaincode to a chaincode container 142 (also referred to herein as a chaincode or a chaincode component). Such developer chaincode can be, for example, smart contracts or other business logic that can be utilized within the users/developer's blockchain ledger.

Figure 6:
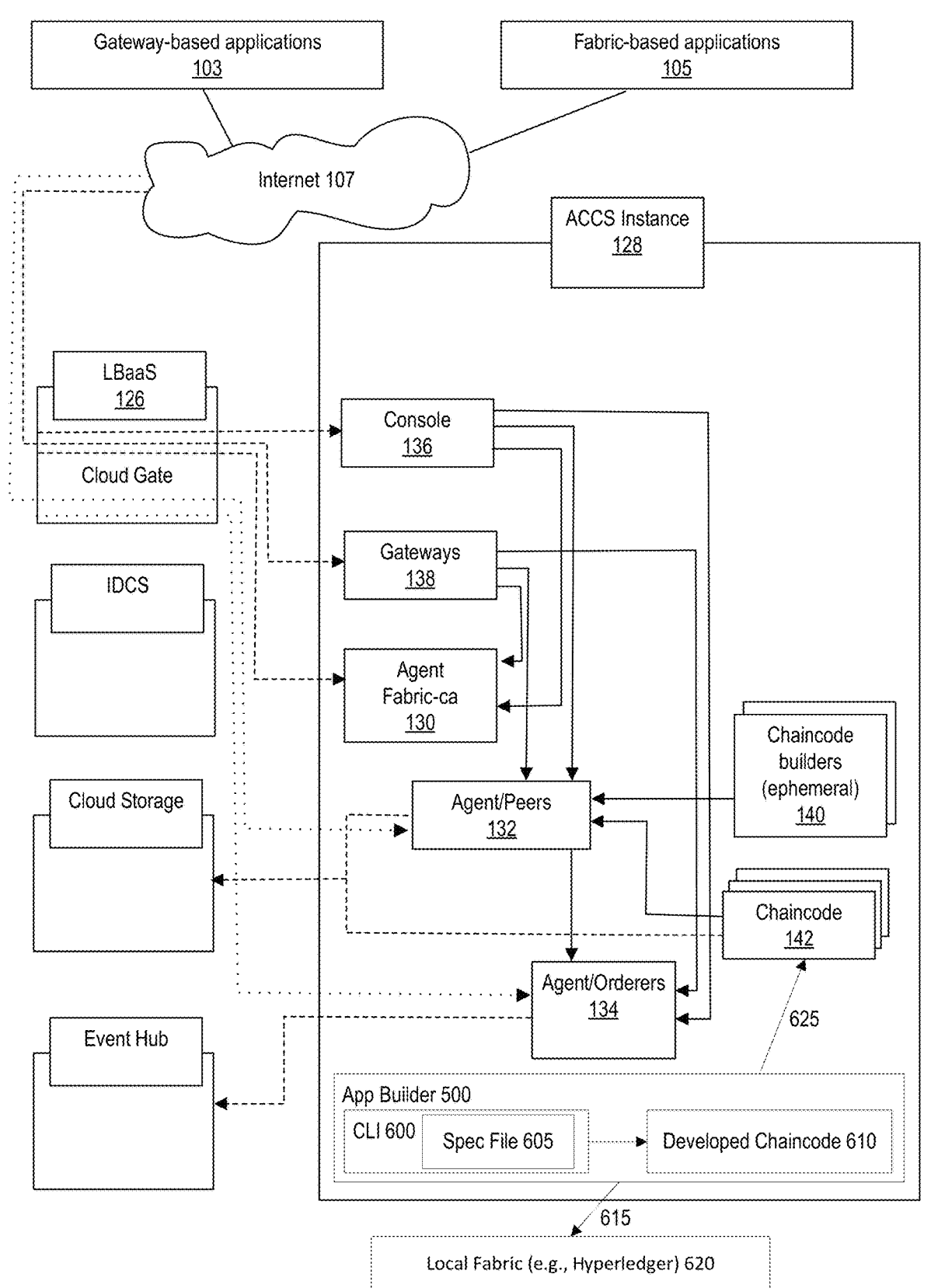
FIG. 6 illustrates an example BCS system in accordance with an embodiment.

FIG. 6 illustrates an example BCS system in accordance with an embodiment. More specifically, the figure shows a BCS runtime with an app builder.

In accordance with an embodiment, provisioned as part of, or in conjunction with, an ACCS instance, a user or developer can be provided with access to an app builder 500. While shown as being a part of the ACCS instance in the figure, one of ordinary skill in the art would readily understand that the app builder can be provided as a separate, standalone tool that can interact with an ACCS instance.

In accordance with an embodiment, the app builder 500 can be utilized by a user or developer to build, test, and deploy 505 chaincode to a chaincode container 142. Such developer chaincode can be, for example, smart contracts or other business logic that can be utilized within the users/developer's blockchain ledger.

In accordance with an embodiment, the app builder 500 can comprise or be associated with a command line interface (CLI) 600. The CLI can be utilized by a user/developer to build or change a specification file 605 that provides a framework for the app builder to generate (e.g., via scaffolding and building code) a smart contract, resulting in developed chaincode 610. Scaffolding can refer to, for example, building or generating an outline structure of code that supports some operations which can then be "filled in" with more specific details.

In accordance with an embodiment, once developed and built, the developed chaincode (e.g., smart contract) 610 can be optionally be deployed 615 to a local (e.g., at the user/developer's on-premise systems) blockchain fabric 620, such as a locally run instance of a Hyperledger Fabric in order for the user/developer to test and debug the chaincode developed via the app builder. Once the debugging and testing has been completed (e.g., via an interactive process in which the specification file is updated, the code scaffolded and developed, and tested at the local fabric), the finished chaincode can be deployed 625 to a chaincode container/compartment/component of the ACCS.

In accordance with an embodiment, once developed and built, the developed chaincode (e.g., smart contract) 610 can be optionally be deployed 625 to a chaincode container/compartment/component of the ACCS for the user/developer to test and debug the chaincode developed via the app builder.

Figure 7:
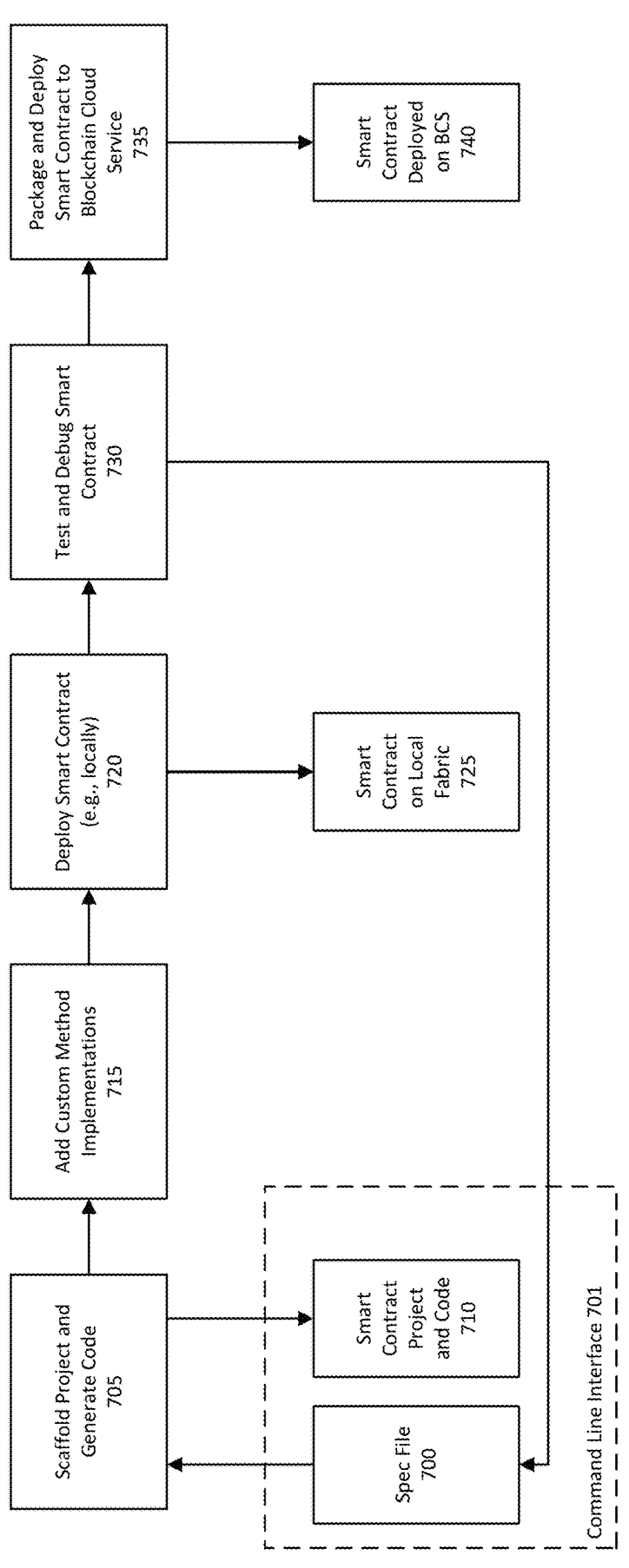
FIG. 7 is a flowchart for developing a smart contact with an app builder via a command line interface, in accordance with an embodiment.

FIG. 7 is a flowchart for developing a smart contact with an app builder via a command line interface, in accordance with an embodiment.

In accordance with an embodiment, a command line interface of the Blockchain App Builder can be utilized by a user or developer to build and scaffold a fully-functional chaincode project from a specification file 700 developed within a command line interface 701.

In accordance with an embodiment, after the project is built, the user or developer can run and test it on, e.g., a local fabric network (e.g., Hyperledger Fabric), or the user's/developer's provisioned BCS instance.

In accordance with an embodiment, a user or developer can utilize a local command line interface tool that works with the CLI (command line interface) of the app builder, or the user can interface directly with a CLI of the app builder.

In accordance with an embodiment, the user or developer can create a specification file 700, and then run a CLI initialization process to scaffold the project and generate code 705, which results in a generated smart contract project and code 710. The generated smart contract project and code can be stored at a memory associated with the app builder.

In accordance with an embodiment, after the chaincode project 710 is created, custom method implementations can be added 715 to the generated smart contract and code.

In accordance with an embodiment, in order to test and debug the generated smart contract and code, the smart contract can be deployed 720, e.g., to a local fabric 725. Optionally, the smart contract project can be deployed remotely to, e.g., a user's/developer's BCS instance.

In accordance with an embodiment, once the chaincode is running on a network (e.g., a local fabric or a BCS instance), the chaincode and the generated methods can be tested and debugged 730. This can be an iterative process in which the testing and debugging results in updates to the specification file 700, and the process can start again.

In accordance with an embodiment, at 735, after the specification file is completed, debugged and tested, the app builder can package and deploy the smart contract to the BCS instance 735, where it can be deployed on, e.g., a ledger of the BCS instance 740.

Figure 8:
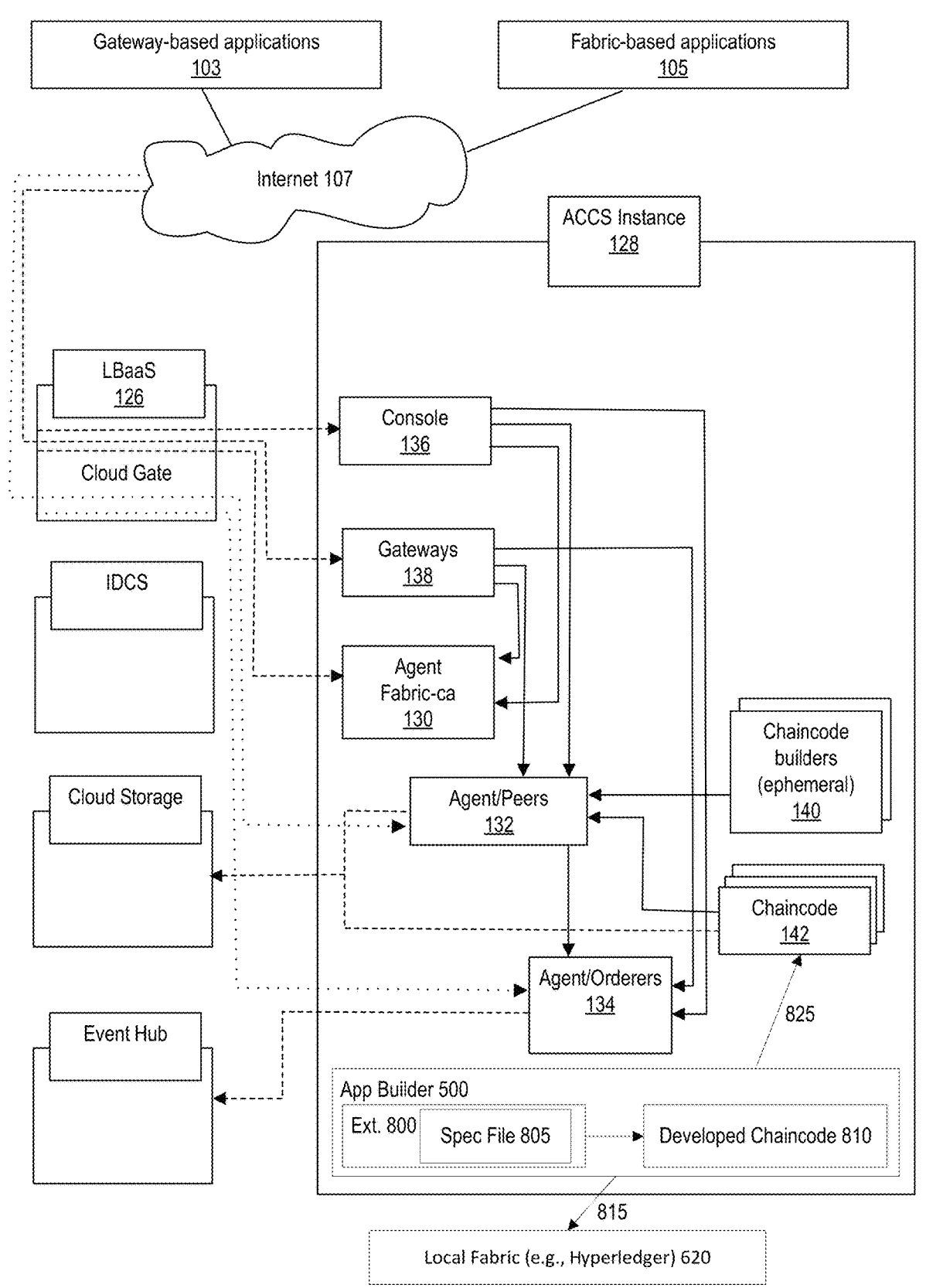
FIG. 8 illustrates an example BCS system in accordance with an embodiment.

FIG. 8 illustrates an example BCS system in accordance with an embodiment. More specifically, the figure shows a BCS runtime with an app builder.

In accordance with an embodiment, provisioned as part of, or in conjunction with, an ACCS instance, a user or developer can be provided with access to an app builder 500. While shown as being a part of the ACCS instance in the figure, one of ordinary skill in the art would readily understand that the app builder can be provided as a separate, standalone tool that can interact with an ACCS instance.

In accordance with an embodiment, the app builder 500 can be utilized by a user or developer to build, test, and deploy 505 chaincode to a chaincode container/compartment/component 142. Such developer chaincode can be, for example, smart contracts or other business logic that can be utilized within the users/developer's blockchain ledger.

In accordance with an embodiment, the app builder 500 can comprise or be associated with an extension, such as an extension for visual studio code 800. The extension can be utilized by a user/developer to build or change a specification file 805 that provides a framework for the app builder to scaffold and build a smart contract via developed chaincode 810. The generated chaincode project and code can be stored at a memory associated with the app builder.

In accordance with an embodiment, once developed and built, the developed chaincode (e.g., smart contract) 810 can be optionally be deployed 815 to a local (e.g., at the user/developer's on-premise systems) blockchain fabric 820, such as a locally run instance of a fabric (e.g., Hyperledger Fabric) in order for the user/developer to test and debug the chaincode developed via the app builder. Once the debugging and testing has been completed (e.g., via an interactive process in which the specification file is updated, the code scaffolded and developed, and tested at the local fabric), the finished chaincode can be deployed 825 to a chaincode container of the ACCS.

In accordance with an embodiment, once developed and built, the developed chaincode (e.g., smart contract) 810 can be optionally be deployed 825 to a chaincode container of the ACCS where the user/developer to test and debug the chaincode developed via the app builder.

Figure 9:
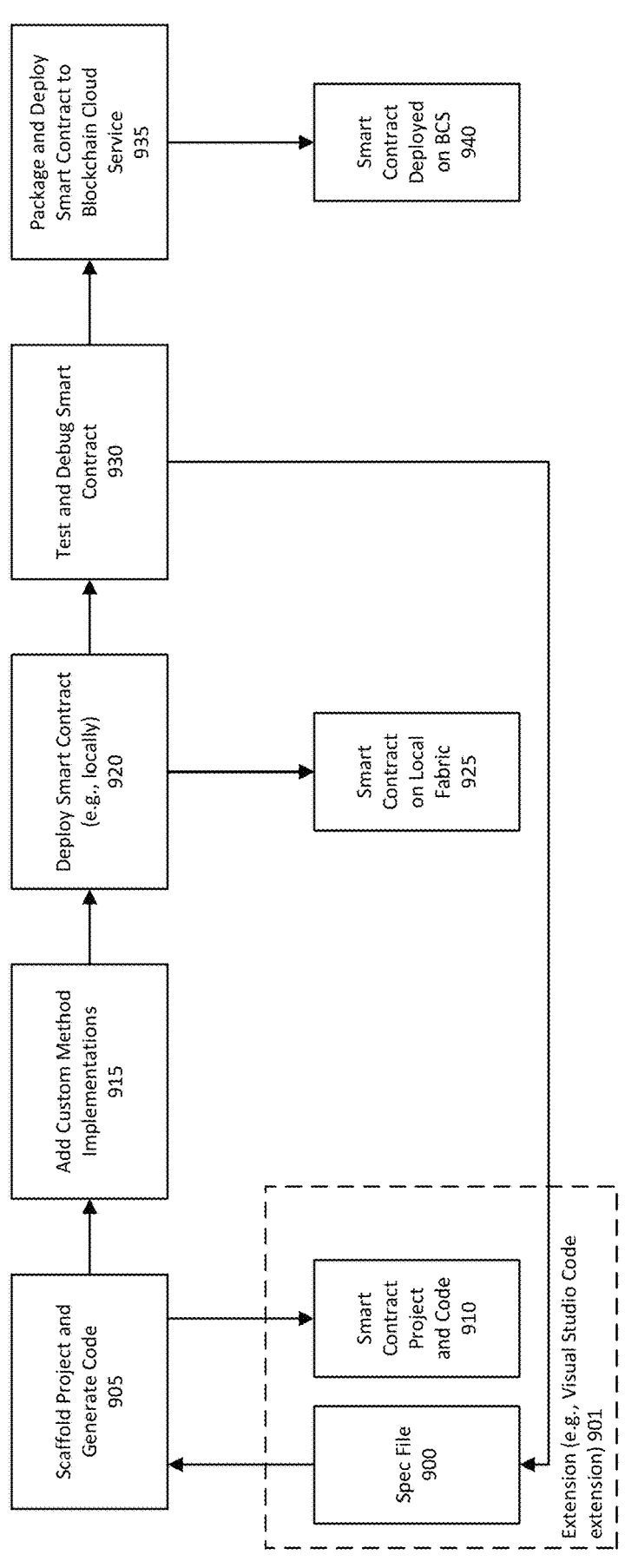
FIG. 9 is a flowchart for developing a smart contact with an app builder via an extension, in accordance with an embodiment.

FIG. 9 is a flowchart for developing a smart contact with an app builder via an extension, in accordance with an embodiment.

In accordance with an embodiment, an extension, such as a Visual Studio Code extension, of the Blockchain App Builder can be utilized by a user or developer to build and scaffold a fully-functional chaincode project from a specification file 900 developed within an extension 901, such as a Visual Studio Code extension.

In accordance with an embodiment, after the project is built, the user or developer can run and test it on, e.g., a local fabric (e.g., Hyperledger Fabric) network, or the user's/ developer's provisioned BCS instance.

In accordance with an embodiment, a user or developer can utilize a local extension that works with the extension of the app builder, or the user can interface directly with an extension of the app builder.

In accordance with an embodiment, the user or developer can create a specification file 900, and then run the extension initialization process to scaffold the project and generate code 905, which results in a generated smart contract project and code 910. The generated chaincode project and code can be stored at a memory associated with the app builder.

In accordance with an embodiment, after the chaincode project 910 is created, custom method implementations can be added 915 to the generated smart contract and code.

In accordance with an embodiment, in order to test and debug the generated smart contract and code, the smart contract can be deployed 920, e.g., to a local fabric 925. Optionally, the smart contract project can be deployed remotely to the user's/developer's BCS instance.

In accordance with an embodiment, once the chaincode is running on a network (e.g., a local fabric or a BCS instance), the chaincode and the generated methods can be tested and debugged 930. This can be an iterative process in which the testing and debugging results in updates to the specification file 900, and the process can start again.

In accordance with an embodiment, at 935, after the specification file is completed, debugged and tested, the app builder can package and deploy the smart contract to the BCS instance 935, where it can be deployed on, e.g., a ledger of the BCS instance 940.

Generating Blockchain Token Support from a Set of Declarations

In accordance with an embodiment, tokenization is a process where tangible (e.g., physical) or intangible (e.g., digital) assets are converted into token that can be moved, stored or recorded into a blockchain. A token is a digital representation of any real, tradeable asset. Representing assets as token allows the use of a ledger to establish state and ownership of an asset, and leverage that to transfer ownership of an asset.

In accordance with an embodiment, for example, token can be used to achieve operational efficiency. As examples: a) an inter-company settlement across multiple subsidiaries having disparate systems; b) quickly tracing back to the elemental components of a finished manufactured product using separate tokens for finished products and sourcing products and creating the lineage across different tokens; c) faster settlement of a contract where there is a condition breach like violation of temperature during medicine transportation-creating tokens for physical assets helps users to create the automation through chaincode for different processes.

In accordance with an embodiment, tokens also provide for high liquidity. As a couple of examples: a) converting hard assets (e.g. real estate, security bonds etc.) and illiquid asset (e.g. precious metals) to tokens to make them liquid asset by raising capital through fractional ownership of the assets (many of the assets in the world can't be traded-converting the assets to token unlocks the value to trade). Fractional ownership reduces the entry barrier for the investors and allows retail investors to take part in the trading process to evolve a new business model; b) invoice can't be split but converting it to token can ensure that the split of receivables is possible. Today, the tokenization is used across multiple different industries like finance, real estate, healthcare, sports, food supply chain etc.

In accordance with an embodiment, the app builder described above can be utilized to manage the complete life cycle of a token. Users and developers can tokenize existing assets and automatically generate token classes and methods to use for token lifecycle management.

In accordance with an embodiment, tokenization (or "Tokenization) is a process where physical or digital assets are represented by tokens, which can be transferred, tracked, and stored on a blockchain. By representing assets as tokens, users and developers can use the blockchain ledger to establish the state and ownership of an asset, and use standard blockchain platform functions to transfer ownership of an asset.

In accordance with an embodiment, the systems and methods described herein can provide for tokenization support. That is, token classes and methods are automatically generated, and additional token methods are provided so that developers can create complex business logic for tokens. The automatically generated project contains token lifecycle classes and functions, CRUD (create, read, update, delete) methods, and additional token SDK methods, and supports automatic validation of arguments, marshalling/unmarshalling, and transparent persistence capability. Users and developers can use these controller methods to initialize tokens, control access, set up accounts, manage roles, and manage the life cycle of tokens.

In accordance with an embodiment, the systems and methods can, based on an underlying structure and libraries, utilize one or more frameworks for the tokenization process. These include, but are not limited to, the standards and classifications of the Token Taxonomy Framework (also referred to herein as "TTF"), the standards and classifications of ERC20 (Ethereum Request for Comments), and more. For the sake of convenience, much of the discussion within the following disclosure may refer to the TTF for the sake of convince. However, one of skill in the art would readily understand that the systems and methods described herein can be utilized in conjunction with various token standards, such as ERC20.

Figure 10:
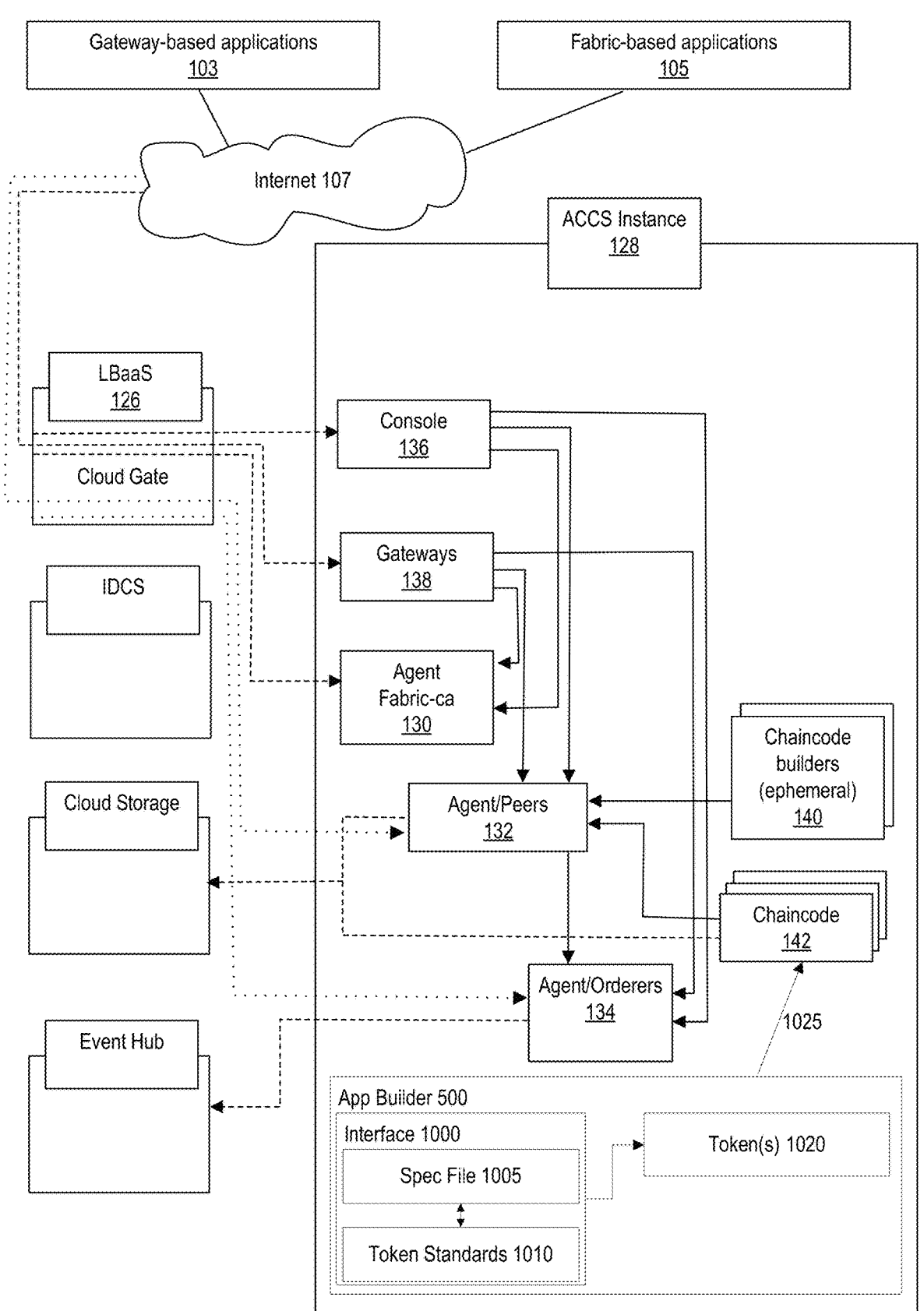
FIG. 10 illustrates an example BCS system in accordance with an embodiment.

The TTF defines a set of standard attributes or properties of tokens that ensures some level of interoperability between implementations. The implementation of these tokens is left up to the user with the TTF just as a standard they can adhere to. This was usually done with a lot of custom coding FIG. 10 illustrates an example BCS system in accordance with an embodiment. More specifically, the figure shows a BCS runtime with an app builder.

In accordance with an embodiment, provisioned as part of, or in conjunction with, an ACCS instance, a user or developer can be provided with access to an app builder 500. While shown as being a part of the ACCS instance in the figure, one of ordinary skill in the art would readily understand that the app builder can be provided as a separate, standalone tool that can interact with an ACCS instance.

In accordance with an embodiment, the app builder 500 can be utilized by a user or developer to build, test, and deploy 505 chaincode to a chaincode container 142. Such developer chaincode can be, for example, smart contracts or other business logic that can be utilized within the users/ developer's blockchain ledger. The app builder component of a blockchain, blockchain cloud system, or other block-chain solution (e.g., Oracle Blockchain Platform) can pro-vide a mechanism to define blockchain assets using a declaration or specification file 1005, and then generate a blockchain smart contract that supports those assets, i.e., token(s) 1020.

In accordance with an embodiment, the app builder 500 can comprise or be associated with an interface 1000, such as a command line interface (CLI), extension for visual studio code. The interface can be utilized by a user/devel-oper to build or change a specification file 1005 that provides a framework for the app builder to scaffold and build a token (or tokens) 1020.

In accordance with an embodiment, in scaffolding and building a completed token(s) 1020, the app builder can utilize both inputs received from the specification file 1005 (where a user or developer can input desired token proper-ties and behaviors), as well as token standards 1010, such as TTF or ERC20. The token standards 1010 can be utilized in scaffolding and generating the token(s) 1020 to, for example, define roles and/or behaviors of a token or tokens that would execute via chaincode 142 within the distributed ledger fabric. The generated project and code can be stored at a memory associated with the app builder.

In accordance with an embodiment, once developed and built, the developed token(s) 1020 (e.g., smart contract) can be optionally be deployed to a local (e.g., at the user/ developer's on-premise systems) blockchain fabric, such as a locally run instance of a Hyperledger Fabric in order for the user/developer to test and debug the tokens developed via the app builder. Once the debugging and testing has been completed (e.g., via an interactive process in which the specification file is updated, the tokens scaffolded and devel-oped, and tested at the local fabric), the finished token(s) can be deployed 1025 to a chaincode container/compartment/ component of the ACCS.

In accordance with an embodiment, once developed and built, the developed token(s) 1020 can optionally be deployed 1025 to a chaincode container/compartment/com-ponent of the ACCS where the user/developer to test and debug the chaincode developed via the app builder.

In accordance with an embodiment, generated tokens (i.e., token chaincode projects) can be deployed by following similar steps as other chaincode projects described above, but there are some special considerations.

In accordance with an embodiment, users and developers can deploy chaincode to only one organization or instance when the standard deployment steps with app builder are used. When a chaincode that includes a token asset is instantiated, the owner of the BCS instance becomes the admin user, who manages the token lifecycle. The admin user can add or remove other users by calling certain methods, such as addAdmin and removeAdmin methods.

In accordance with an embodiment, to deploy to multiple organizations or instances, the chaincode for the token can be packaged and then manually deployed it to all the instances.

In accordance with an embodiment, some databases and ledgers, such as Hypderledger, use multi-version concurrency control (MVCC) to avoid double-spending and data inconsistency. When the same state is updated, a new version of the record overwrites the old version. If there are concurrent requests to update the same key in a block, an MVCC_READ_CONFLICT error might be generated. To work around this behavior, the client application can retry requests when this error is generated, or a queue can be used to capture concurrent requests before they are sent to the blockchain network.

In accordance with an embodiment, the systems and methods described herein provide a mechanism for defining Tokens (e.g., Fungible or Non Fungible Tokens) adhering to a framework, such as the Token Taxonomy Framework, and generating the appropriate methods as defined by the token properties.

In accordance with an embodiment, using a declarative model for defining tokens and generating the normally hand written code, users can produce applications/chaincode/ tokens far faster and with fewer bugs.

In accordance with an embodiment, the presently dis-closed systems and methods can allow for: automatic gen-eration of a token chaincode based on a specification file; out of the box wrapper functions that are automatically gener-ated to build any tokenization application; automatic gen-eration of standard (e.g., TTF) compliant SDK functions to help application developers to build any custom functions for tokenization.

In accordance with an embodiment, the presently dis-closed systems and methods can provide for security on authorized users to initialize a token, create token accounts and add roles to the token accounts. That is, a blockchain user who installs and instantiates a token chaincode can become an admin. Admins can initialize the tokens, create the token accounts and add roles (e.g., minter/burner/notary) for various user accounts. An admin can add/remove another user as admin.

In accordance with an embodiment, roles (e.g., minter/ burner/notary) can be declared in the specification file. If no roles are specified then the users of the chaincode, via the roles assigned to the tokens, will get the roles automatically.

In accordance with an embodiment, the presently dis-closed systems and methods can provide token related validations (limiting criteria mentioned in the specification file; e.g. MAX_MINT_QUANTITY parameter value) which are automatically added to the auto generated code. The systems and methods can further maintain a complete token life cycle from token generation until the tokens are burnt/ destroyed.

In accordance with an embodiment, the systems and methods enable application developers to: develop the token chaincodes faster; adhere to token standards, such as the Token Taxonomy Framework standards; follow the chain-code coding standards; generate the code with fewer/no bugs; and develop tokens without expertise on how to maintain the token life cycle or how to build token chain-codes.

In accordance with an embodiment, the specification file defines the various tokens a smart contract can support, their properties, and their behaviors. This file can be provided in various formats, such as JSON (JavaScript Object Notation) or YAML, and is used to generate smart contracts in, for example, Go or TypeScript. The specification file can be used to generate a smart contract, e.g., via scaffolding the smart contract project and then filling in details, that can support the defined tokens along with any custom methods the developer needs to write. Changes in the specification file can be merged with the generated code to preserve any edits made by the developer to the generated code. The generated code can be broken up into two or more parts. A model file that defines the structure of the tokens, and a controller file that provides the methods that can be used to operate on the tokens.

Figure 11:
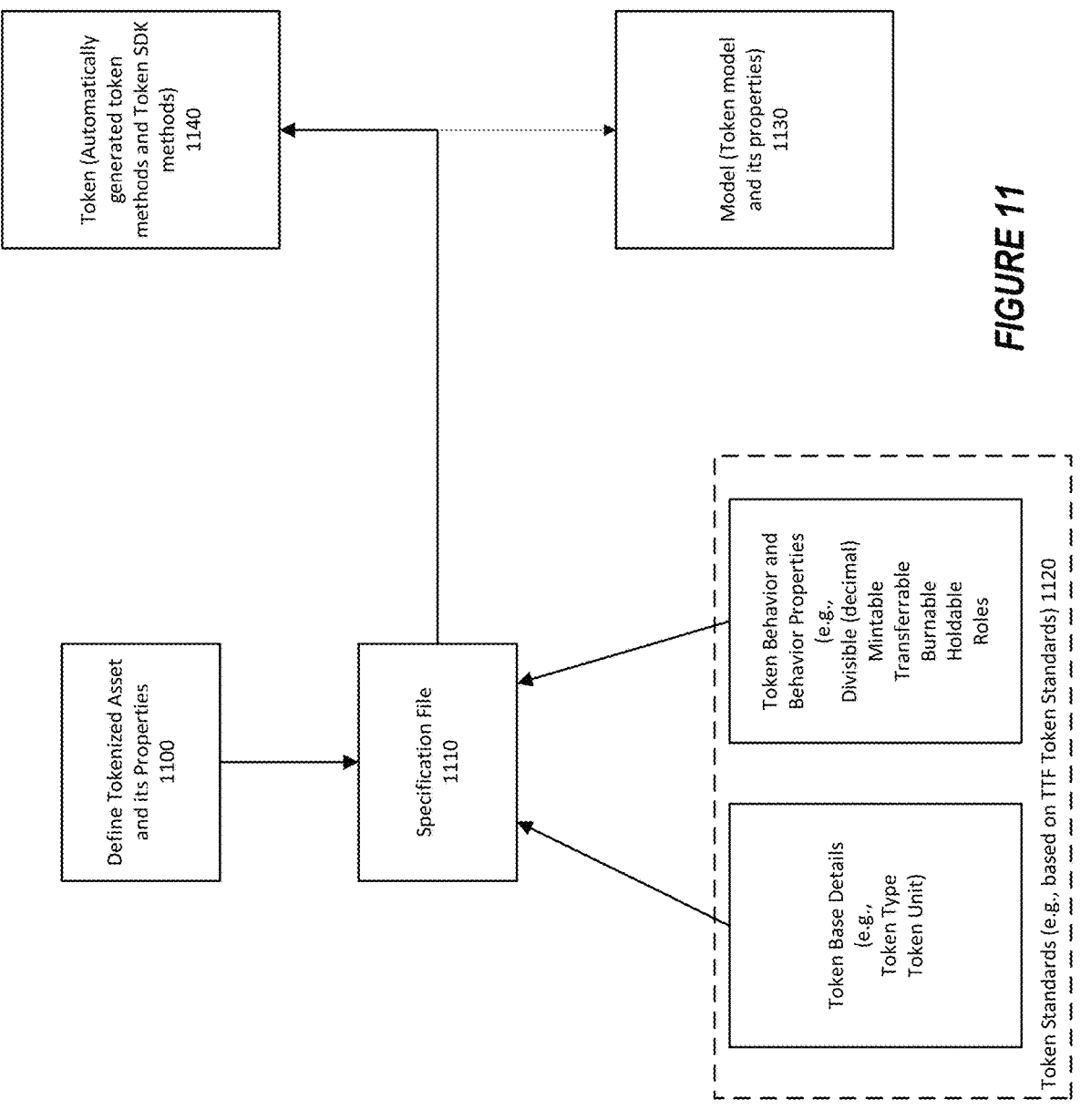
FIG. 11 is a flowchart of a tokenization within a blockchain cloud environment, in accordance with an embodiment.

FIG. 11 is a flowchart of a tokenization within a blockchain cloud environment, in accordance with an embodiment.

More specifically, FIG. 11 illustrates a tokenization process utilizing an app builder, as described above, in accordance with an embodiment.

In accordance with an embodiment, a tokenization flow follows these basic steps. At 1100, the system and methods can accept inputs indicative of or comprising details, configurations, or other data placed into a specification file. Such inputs can be indicative of a user's or developer's choices/designs on what token behaviors to specify (e.g., mintable, transferable, divisible, holdable, burnable, and roles). The token assets, behaviors, and properties can be defined at the input specification file 1110.

In accordance with an embodiment, at 1140, the token chaincode project from the input specification file can be scaffolded. This creates a scaffolded project, including a model 1130 that contains the token asset definition and its properties and a controller that contains the token's behavior and methods. Additionally, the scaffolded token project 1140 can reflect token standards 1120, such as the base details of the token, such as a token type (e.g., fungible or non-fungible) and a token unit (e.g., fractional). The token standards can also reflect the token behavior and behavior properties, such as whether the token is divisible (e.g., decimal), mintable, transferrable, burnable, holdable, as well as roles associated with tokens, such as minter, burner, admin . . . etc.

In accordance with an embodiment, once the token has been scaffolded and generated, the token can be deployed and tested, e.g., either at a local fabric, or onto a cloud based distributed ledger, such as BCS described above.

In accordance with an embodiment, once a token-based project has been deployed, the typical flow for creating tokens and completing lifecycle operations follows these steps. The user or developer that instantiates the token chaincode becomes the Token Admin of the chaincode. A tokenized asset is initialized, which creates the token_id, a unique identifier for that particular instance of token. Accounts can be created for every user who will possess tokens or complete token-related operations.

In accordance with an embodiment, if the roles behavior is specified for the token, then roles are added to user/token before a user of the token can complete token-related operations. Conversely, if a role is defined with the specification file, but is not assigned to any token/user, then each token/user can utilize that role. For example, if a burner role is defined within the specification file, but no token is assigned to the burner role, then all tokens will have the burner role.

In accordance with an embodiment, token life cycle methods can then be used, based on the behaviors that were specified for the token asset. For example, the issue Tokens method can be called to mint tokens for an account.

Figure 12:
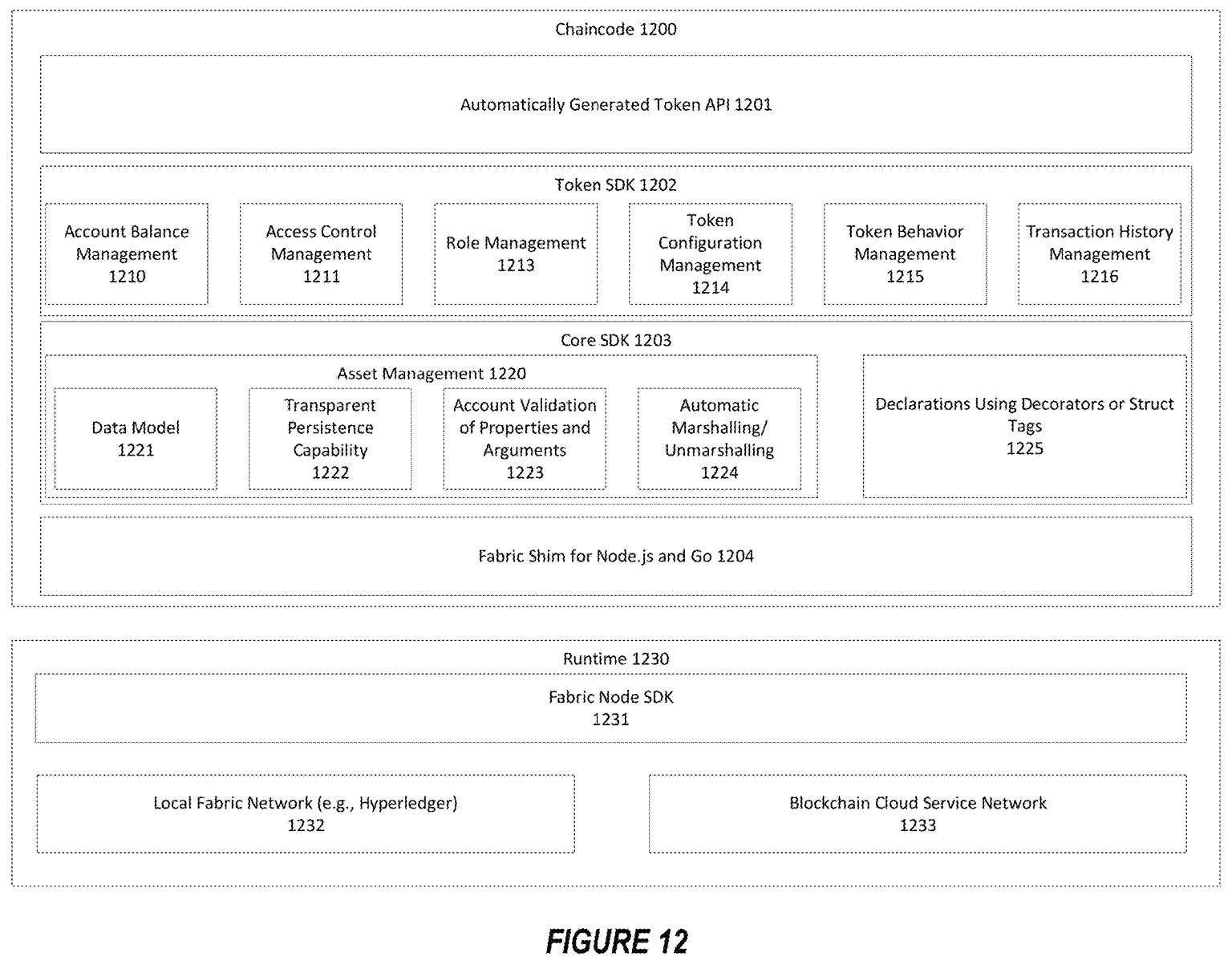

FIG. 12 illustrates an architecture of a token implemented by an app builder, in accordance with an embodiment.

More specifically, FIG. 12 shows a token architecture implemented by Blockchain App Builder, including the token API and token SDK. The App Builder can generate Token related class and methods. It also provides a Tokenization related SDK to help developers code complex token specific business logic. These classes and methods can be built on top of existing App Builder Core SDK. The SDK provides interfaces and implementations using the underlying Fabric shim methods of Node.js and Go languages.

In accordance with an embodiment, as a part of chaincode generation process, certain Token APIs are made available to be invoked directly at runtime. These automatically generated Token APIs cover the entire lifecycle of tokens and can be executed without any additional coding. The methods include setting up of tokens, setting up of roles, creating accounts, transactions and all token lifecycle behavior operations like mint, transfer, hold, burn etc. These methods use token SDK 1202 to perform its operations.

In accordance with an embodiment, the exemplary token architecture can comprise a chaincode 1200 portion as well as a runtime 1230 portion. The chaincode can comprise an automatically generated token API 1201, a token SDK (service development kit) 1202, a core SDK 1203, and a fabric shim for, e.g., node.js and Go 1204.

In accordance with an embodiment, the runtime 1230 can comprise a fabric node SDK 1231, and can be associated with, e.g., a local fabric network 1231, or a BCS network 1233.

In accordance with an embodiment, the generated token (e.g., via scaffolding and developing) SDK can comprise account balance management 1210, access control management 1211, role management 1213, token configuration management 1214, token behavior management 1215, and transaction history management 1216.

In accordance with an embodiment, account balance management 1210 can be used by a tokenization feature of, e.g., the App Builder, to represent tokenized assets as balances within an account. These accounts are similar to bank accounts, where each account experiences direct deposit and transfer with state transitions. An account balance model is used due to its simplicity, flexibility to incorporate TTF behaviors and its small transaction sizes. The token SDK provides methods which operate on this account, such as methods comprising create accounts, fetch balance, etc.

In accordance with an embodiment, access control management 1211 can be used to provide the tokenization feature with access control. Certain methods can be invoked only by the 'Token Admin' or 'Account Owner' of the token. With this feature, a user/administrator can ensure that certain operations are carried out only by the intended/authorized user. Any misuse will result in an error.

In accordance with an embodiment, access control 1211 can be utilized with a plug & play design. If a user/ administrator wants to use their own access control or none at all, the user/administrator can remove the corresponding SDK code from the auto-generated controller methods.

In accordance with an embodiment, methods are provided for adding/removing of roles to an account via role management 1213. These methods can be called if 'roles' behavior is enabled for a token. Once roles are set, certain token behavior methods can be invoked if the role matches for the given account.

In accordance with an embodiment, administration management 1214 can be used when a token chaincode is instantiated. Then, a list of users is specified. These users become the 'Token Admin' of the chaincode. Methods can be provided for a 'Token Admin' to add/remove other admins.

In accordance with an embodiment, token behavior management 1215 can govern behaviors of a token. The behaviors of a token depends on the type and unit of token. For the fungible and fractional tokens, behaviors including "mintable", "transferable", "divisible", "holdable", "roles" and "burnable" can be supported. Methods are available which implement all the above behaviors for a given token. These methods represent the lifecycle of a token.

In accordance with an embodiment, transaction history management 1216 can provide methods to fetch transaction records for an account and the history of a transaction as well. This can be called by a user/administrator directly. Older transaction records can be deleted by the user/administrator to save space, but it is available in the historyDB.

In accordance with an embodiment, the generated (e.g., via scaffolding and developing) core SDK 1203 can comprise asset management 1220, which can comprise a data model 1221, transparent persistence capability 1222, account validation of properties and arguments 1223, and automatic marshalling/unmarshalling 1221. The code SDK can further comprise declarations using decorators and struc tags 1225.

In accordance with an embodiment, the token SDK 1202 is built on top of core SDK 1203. The core SDK provides support for rapid development by including features like transparent persistence capability (ORM), CRUD methods, automatic validation of arguments, marshalling/un-marshalling. A developer can call them out with only couple of lines of code.

In accordance with an embodiment, every asset created by App Builder comprises certain features. The asset management 1220 feature can be used to manage and configure the assets quickly, which reduces the development time.

In accordance with an embodiment, as assets are modelled as individual classes which follows the model-controller pattern. Users/administrators can utilize the data model 1221 to specify the properties of the asset. Then, the operations on the asset are taken care by the core SDK. This provides a simpler way for the user/administrator to create an application and focus only on the business logic. With this model, assets can have relationships with other assets using embedded asset or referenced asset.

In accordance with an embodiment, with transparent persistence capability 1222, assets can be mapped as an ORM (object-relational mapping) by which user can perform basic CRUD operations on the stateDB with a single statement. All the validations, marshalling/un-marshalling, write/query to stateDB happens behind the scenes.

In accordance with an embodiment, with automatic validation of properties and arguments 1223, certain validations can be applied on asset properties and method arguments using simple decorators or struct tags. All the implementation details for those validations are taken care by the core SDK.

In accordance with an embodiment, the automatic marshalling/unmarshalling 1224 can be used when working with stateDB and with data that needs to be converted from bytes to JSON and vice versa, for example. This transformation is done automatically by the core SDK and the user/administrator need does not need to intervene.

In accordance with an embodiment, declarations using decorators or struct tags 1225 can be used to provide support for above features like validation and marshalling/unmarshalling (e.g., via various decorators or struct tags). With this, a user/administrator can simply declare the required behavior in a single statement.

In accordance with an embodiment, Fabric Shim for Node.js and Go 1204 can be utilized by the SDK for the implementation of all the above features. Fabric shim provides the chaincode interface, a low-level API for implementing chaincodes and communicating with fabric.

In accordance with an embodiment, within the runtime 1230, chaincode generated using App Builder can be deployed in a fabric network, such as a Hyperledger Fabric, running in local system 1232, or in a blockchain cloud service network 1233, such as BCS. The Fabric Node SDK 1231 is used to interact with, e.g., a blockchain fabric such as a Hyperledger Fabric blockchain network.

In accordance with an embodiment, from app builder, a Hyperledger Fabric network can be created and run in, e.g., a user's local system (local fabric network 1232). The chaincode can then be executed and tested locally using Fabric Node SDK 1231.

In accordance with an embodiment, the generated chaincode can be deployed to a remote (not at a user's/administrator's local system) blockchain cloud service network 1233 from App Builder using Fabric Node SDK 1231. The chaincode can also be executed and tested remotely from app builder.

In accordance with an embodiment, the tokens that are generated (e.g., via scaffolding and developing) by the app builder can be based upon an account balance model. The app builder can support fungible, fractional tokens. Fungible tokens have an interchangeable value. Any quantity of fungible tokens has the same value as any other equal quantity of the same class of token. Fractional tokens can be subdivided into smaller parts, based on a specified number of decimal places.

In accordance with an embodiment, tokens can also be described by behaviors. Supported behaviors include, but are not limited to: mintable, transferable, divisible, holdable, burnable, and roles.

In accordance with an embodiment, the tokenization feature uses an account/balance model to represent tokenized assets as balances in an account. Accounts are similar to typical banking accounts, where deposits and transfers and other state transitions affect the balance of an account. The balance of every account is tracked globally, to ensure that transaction amounts are valid. The on-hold balance and transaction history are also tracked.

In accordance with an embodiment, any user who possesses tokens or completes token-related operations at any point can have an account on the network. Every account is identified by a unique ID (account_id). The account ID can be a unique ID, such as one created by combining a user name or email ID (user_id) of the instance owner or the user who is logged in to the instance with the membership service provider ID (org_id) of the user in the current network organization and the unique token ID (token_id). Ready-to-use methods are provided for account creation. Because the account ID includes the organization ID, users can be supported across multiple organizations.

Token Specification File

In accordance with an embodiment, tokenized asset details and its properties are specified in a specification file. The token details include the anatomy of token, i.e., its type, unit, token behavior, and its behavior properties. In some embodiments, a standard can be followed, such as TTF, in order to help structure the token and have certain behaviors and roles across all tokens. The behaviors of a token depend on the type and unit of token. For the fungible and fractional tokens, for example, behaviors such as "mintable", "transferable", "divisible", "holdable", "roles" and "burnable" can be supported.

In accordance with an embodiment, the specification file can be used to generate the necessary model and controller files with token related methods. These out-of-the-box controller methods can help users and developers with initializing tokens, access control, account setup, role management and managing lifecycle of tokens. With these methods, a user or developer can start the lifecycle of token immediately and require no additional coding.

In accordance with an embodiment, the specification file can be written in both yaml/json format. The tokenized asset can be configured in a specification file, an example of which is provided below:

```
assets:
    name: digicur
        type: token
    anatomy:
            type: fungible
            unit: fractional
    behavior:
            divisible:
                decimal: 1
            mintable:
                max_mint_quantity: 20000
            transferrable
            burnable
            holdable
            roles:
                minter_role_name: minter
                burner_role_name: burner
                notary_role_name: notary
        properties:
            name: token_to_currency_ratio
            type: number
            name: currency_representation
            type: string
    customMethods:
        executeQuery
```

In accordance with an embodiment, the asset field in the above specification file takes the definition and behavior of the asset. The asset can be normal or tokenized. It can be differentiated by the "type" property defined later. A user may define multiple asset definitions in this field.

In accordance with an embodiment, the "name" field in the above specification file can be used to define the name of an asset.

In accordance with an embodiment, the "type" field in the above specification file can be used to define the kind of asset to be generated. For example, the 'type' property can be set to "embedded" and "token" values. Not specifying any type will create a normal asset.

In accordance with an embodiment, the "anatomy" field in the above specification file can be used to define the type and unit of the token.

In accordance with an embodiment, the "anatomy: type" field in the above specification file can be used to state the difference between token types, e.g., fungible/non-fungible. The 'fungible' token is defined as the tokens which have interchangeable value with one another, where any quantity of them has the same value as another equal quantity if they are in the same class. Conversely, a non-fungible token cannot be interchanged with other tokens, as any two non-fungible tokens do not necessarily have the same value as another non-fungible token in equal quantity. This is a mandatory property.

In accordance with an embodiment, the "anatomy: unit" field in the above specification file can be used to define the quantity and subdivision restrictions of a token like fractional/whole/singleton. For example, a 'fractional' token is defined as a token which can be sub-divided or split into smaller units or parts based on a certain number of decimal places.

In accordance with an embodiment, the "behavior" field in the above specification file describes the capability or restrictions of a token. For example, the 'behavior' property can accept the below set of behaviors and its properties.

In accordance with an embodiment, one behavior which can be set within the behavior field is "mintable". The token class that implements this behavior will support the minting or issuing of new token instances in the class. These new tokens can be minted and belong to the owner. The behavior property 'max_mint_quantity' limits the total number of token that can be minted. If not specified then any number of tokens can be minted. The behavior property 'max_mint_quantity' is optional.

In accordance with an embodiment, another behavior which can be set within the behavior field is transferrable. Every token instance has an owner. The 'transferable' behavior provides the owner the ability to transfer the ownership to another party or account.

In accordance with an embodiment, another behavior which can be set within the behavior field is divisible. The property describes the ability for the token to be subdivided from a single whole token into fractions, which are represented as decimal places. Any value greater than 0 can indicate how many fractions are possible where the smallest fraction is also the smallest own-able unit of the token.

In accordance with an embodiment, another behavior which can be set within the behavior field is 'decimal'. This property can define the number of decimal places. If not specified the decimal value is 0.

In accordance with an embodiment, another behavior which can be set within the behavior field is holdable. A hold specifies a payer, a payee, a maximum amount, a notary and an expiration time.

In accordance with an embodiment, another behavior which can be set within the behavior field is "roles". A token can have behaviors that the class will restrict invocations to a select set of parties or accounts that are members of a role or group. This is a generic behavior that can apply to a token many times to represent many role definitions within the template. This behavior can allow a user or developer to define what role(s) to create and what behavior(s) to apply the role to the TokenDefinition. Some examples of roles that are supported include, but are not limited to, 'minter_role_name', 'burner_role_name' and 'notary_role_name'.

In accordance with any embodiment, if any of the role behavior properties are not mentioned in the specification (also referred to herein as "spec") file, then that role is applied to each token, and any user can perform that role. For example, if 'burner_role_name' is not mentioned but "burnable" behavior is selected in the spec file, then any account owner can act as a burner.

In accordance with an embodiment, another behavior which can be set within the behavior field is burnable. A token class that implements this behavior can support the burning or decommissioning of token instances of the class. This does not delete a token, but rather places it in a permanent non-use state. Burning is a one-way operation and cannot be reversed.

In accordance with an embodiment, the "properties" field in the above specification file can mention all the custom properties of the tokenized asset. These properties follow the same behavior as 'properties' in normal asset.

In accordance with an embodiment, the "custom methods" field in the above specification file creates invokable custom method templates in the main controller file. It takes the method signature and creates the method declaration in the controller file. This property also follows the same behavior as 'customMethods' property in normal asset.

FIG. 13 is a flowchart of method for generating block-chain token support from a set of declarations, in accordance with an embodiment.

In accordance with an embodiment, at step 1310, the method can provide a computer system operating as a distributed ledger, the distributed ledger comprising at least a chaincode component and a ledger component.

In accordance with an embodiment, at step 1320, the method can provide an application builder component that comprises an automatic code generation system.

In accordance with an embodiment, at step 1330, the method can receive, at the application builder, a specification file, the specification file comprising a plurality of inputs to be utilized in the automatic code generation system.

In accordance with an embodiment, at step 1340, the method can, automatically generate code to be run on the distributed ledger based on the received specification file. The automatically generation code can comprise generating chaincode based upon the plurality of inputs from the specification file, and writing the chaincode to a memory associated with the application builder.

In accordance with an embodiment, at step 1350, the method can transfer the automatically generated code to the chaincode component to be run on the ledger component.

While various embodiments of the present disclosure have been described above, it should be understood that they have been presented by way of example, and not limitation. The embodiments were chosen and described in order to explain the features and principles of the disclosure and its practical application. The embodiments illustrate systems and methods in which the various features of the present disclosure are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present disclosure are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present disclosure are implemented in a computer including a processor, a computer-readable storage medium, and a network card/interface for communicating with other computers. In some embodiments, features of the present disclosure are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present disclosure are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the disclosure are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present disclosure are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (Saas), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present disclosure are implemented using, or with the assistance of hardware, software, firmware, or combinations thereof. In some embodiments, features of the present disclosure are implemented using a processor configured or programmed to execute one or more functions of the present disclosure. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present disclosure are implemented by circuitry that is specific to a given function. In other implementations, features are implemented in a computer, computing system, processor, and/or network, configured to perform particular functions using instructions stored e.g. on a computer-readable storage media.

In some embodiments, features of the present disclosure are incorporated in software and/or firmware for controlling the hardware of a processing and/or networking system, and for enabling a processor and/or network to interact with other systems utilizing the features of the present disclosure. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present disclosure includes a computer program product which is a machine-readable or computer-readable storage medium (media) having instructions comprising software and/or firmware stored thereon/in, which instructions can be used to program or otherwise configure a system such as a computer to perform any of the processes or functions of the present disclosure. The storage medium or computer readable medium can include any type of media or device suitable for storing instructions and/or data including, but not limited to, floppy disks, hard drives, solid state drives, optical discs, DVD, CD-ROMs, micro-drives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the disclosure to the precise forms disclosed. Additionally, where embodiments of the present disclosure have been described using a particular series of transactions and steps, it should be apparent to those skilled in the art that, unless stated, the embodiment does not exclude performance of additional transactions and steps. Further, while the various embodiments describe particular combinations of features of the disclosure it should be understood that different combinations of the features will be apparent to persons skilled in the relevant art as within the scope of the disclosure. In particular, a feature (device-like or method-like) recited in a given embodiment, variant, or shown in a drawing may be combined with or replace another feature in another embodiment, variant or drawing, without departing from the scope of the present disclosure. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the disclosure. It is intended that the broader spirit and scope of the disclosure be defined by the following claims and their equivalents.

What is claimed is:

1. A system for generating a blockchain token from a set of declarations, comprising:

a computer system operating as a distributed ledger, the distributed ledger comprising at least a chaincode component and a ledger component;

wherein the system automatically generates a chaincode based upon received instructions comprising a specification file, the automatically generated chaincode being deployed to a local fabric;

wherein the specification file comprises a plurality of definitions, the plurality of definitions comprising one or more of asset definitions, behavior definitions, and/or role definitions;

wherein the automatically generated chaincode deployed to the local fabric is tested, the testing comprising:

scaffolding a code of a smart contract based upon the specification file, testing the scaffolded code at the local fabric, and based upon the testing of the scaffolded code at the local fabric, updating the specification file to provide an updated specification file; and automatically generating, based upon the updated specification file, a second chaincode for deployment to the distributed ledger.

2. The system of claim 1, wherein automatically generating the second chaincode comprises:

automatically building a smart contract based upon the received instructions and the updated specification file, the smart contract being associated with a token specified within the updated specification file;

wherein the smart contract defines optional roles for the token specified within the updated specification file, the optional roles being specified by role definitions of the specification file; and wherein the smart contract is tested and deployed to the chaincode component.

3. The system of claim 2, wherein a behavior specified within the updated specification file defines, for a token constructed by the smart contract and deployed to the ledger component, one or more behaviors for the constructed token.

4. The system of claim 2, wherein a role specified within the updated specification file defines, for a token constructed by the smart contract and deployed to the ledger component, one or more of a plurality of token roles, the plurality of token roles comprising a minter role, a burner role, and a notary role.

5. The system of claim 1, wherein automatically generating the second chaincode comprises:

generating the chaincode based upon the updated specification file and the received instructions, the received instructions specifying instructions to generate a token for use on ledger component, retrieving, from the received instructions, at least one assigned behavior, assigning the at least one assigned behavior to the token via the automatically generated second chaincode, and detecting whether a token role is associated with the token within the received instructions, and upon detecting that no token role is assigned to the token, assigning each of a plurality of token roles to the token via the automatically generated second chaincode.

6. The system of claim 5, wherein the plurality of token roles comprise a minter role, a burner role, and a notary role.

7. A method for generating a blockchain token from a set of declarations, comprising:

providing a computer system operating as a distributed ledger, the distributed ledger comprising at least a chaincode component and a ledger component;

automatically generating a chaincode based upon received instructions, the instructions comprising a specification file, the automatically generated chaincode being deployed to a local fabric, and wherein the specification file comprises a plurality of definitions, the plurality of definitions comprising one or more of asset definitions, behavior definitions, and/or role definitions;

testing the automatically generated chaincode deployed to the local fabric, the testing comprising:

scaffolding a code of a smart contract based upon the specification file, testing the scaffolded code at the local fabric, and based upon the testing of the scaffolded code at the local fabric, updating the specification file to provide an updated specification file; and automatically generating, based upon the updated specification file, a second chaincode for deployment to the distributed ledger.

8. The method of claim 7, wherein automatically generating the second chaincode comprises:

automatically building a smart contract based upon the received instructions and the updated specification file, the smart contract being associated with a token specified within the updated specification file;

wherein the smart contract defines optional roles for the token specified within the updated specification file, the optional roles being specified by role definitions of the specification file; and wherein the smart contract is tested and deployed to the chaincode component.

9. The method of claim 8, wherein a behavior specified within the updated specification file defines, for a token constructed by the smart contract and deployed to the ledger component, one or more behaviors for the constructed token.

10. The method of claim 8, wherein a role specified within the updated specification file defines, for a token constructed by the smart contract and deployed to the ledger component, one or more of a plurality of token roles, the plurality of token roles comprising a minter role, a burner role, and a notary role.

11. The method of claim 7, wherein automatically generating the second chaincode comprises:

generating the chaincode based upon the updated specification file and the received instructions, the received instructions specifying instructions to generate a token for use on ledger component, retrieving, from the received instructions, at least one assigned behavior, assigning the at least one assigned behavior to the token via the automatically generated second chaincode, and detecting whether a token role is associated with the token within the received instructions, and upon detecting that no token role is assigned to the token, assigning each of a plurality of token roles to the token via the automatically generated second chaincode.

12. The method of claim 11, wherein the plurality of token roles comprise a minter role, a burner role, and a notary role.

13. A non-transitory computer readable storage medium having instructions thereon for generating a blockchain token from a set of declarations, which when read and executed cause a computer to perform a method comprising:

running a distributed ledger on the computer, the distributed ledger comprising at least a chaincode component and a ledger component;

automatically generating a chaincode based upon received instructions, the instructions comprising a specification file, the automatically generated chaincode being deployed to a local fabric, and wherein the specification file comprises a plurality of definitions, the plurality of definitions comprising one or more of asset definitions, behavior definitions, and/or role definitions;

testing the automatically generated chaincode deployed to the local fabric, the testing comprising:

scaffolding a code of a smart contract based upon the specification file, testing the scaffolded code at the local fabric, and based upon the testing of the scaffolded code at the local fabric, updating the specification file to provide an updated specification file; and automatically generating, based upon the updated specification file, a second chaincode for deployment to the distributed ledger.

14. The non-transitory computer readable storage medium of claim 13, wherein automatically generating the second chaincode comprises:

automatically building a smart contract based upon the received instructions and the updated specification file, the smart contract being associated with a token specified within the updated specification file;

wherein the smart contract defines optional roles for the token specified within the updated specification file, the optional roles being specified by role definitions of the specification file; and wherein the smart contract is tested and deployed to the chaincode component.

15. The non-transitory computer readable storage medium of claim 14, wherein a behavior specified within the updated specification file defines, for a token constructed by the smart contract and deployed to the ledger component, one or more behaviors for the constructed token.

16. The non-transitory computer readable storage medium of claim 14, wherein a role specified within the updated specification file defines, for a token constructed by the smart contract and deployed to the ledger component, one or more of a plurality of token roles, the plurality of token roles comprising a minter role, a burner role, and a notary role.

17. The non-transitory computer readable storage medium of claim 13, wherein automatically generating the second chaincode comprises:

generating the chaincode based upon the updated specification file and the received instructions, the received instructions specifying instructions to generate a token for use on ledger component, retrieving, from the received instructions, at least one assigned behavior, assigning the at least one assigned behavior to the token via the automatically generated second chaincode, and detecting whether a token role is associated with the token within the received instructions, and upon detecting that no token role is assigned to the token, assigning each of a plurality of token roles to the token via the automatically generated second chaincode, the plurality of token roles comprising a minter role, a burner role, and a notary role.

* * * * *